United States Patent
Sadahira et al.

(10) Patent No.: US 6,297,483 B2
(45) Date of Patent: Oct. 2, 2001

(54) INDUCTION HEATING OF HEATING ELEMENT

(75) Inventors: Masafumi Sadahira, Toyonaka; Youji Uetani, Amagasaki; Shinji Kondoh, Toyonaka; Hidekazu Yamashita, Osaka; Hideki Omori, Akashi; Tetsuo Obata, Toyonaka; Takayuki Urata, Hyogo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/026,040

(22) Filed: Feb. 19, 1998

(30) Foreign Application Priority Data

Jun. 11, 1997 (JP) .................................................. 9-153351
Nov. 27, 1997 (JP) .................................................. 9-325742

(51) Int. Cl.⁷ ................................. H05B 6/10; H05B 6/40
(52) U.S. Cl. .......................... 219/629; 219/630; 219/634; 219/672; 219/674
(58) Field of Search ................................. 219/628, 629, 219/630, 634, 670, 672, 674

(56) References Cited

U.S. PATENT DOCUMENTS

| | | |
|---|---|---|
| 2,494,716 * | 1/1950 | McMahom et al. ................. 219/628 |
| 4,136,276 * | 1/1979 | Ashe .................................... 219/630 |
| 4,471,191 * | 9/1984 | Greis et al. .......................... 219/630 |
| 4,503,305 * | 3/1985 | Virgin ................................. 219/630 |
| 4,560,849 * | 12/1985 | Migliori et al. ..................... 219/628 |
| 4,660,212 * | 4/1987 | Boen et al. .......................... 219/634 |
| 5,104,594 | 4/1992 | Hillemeier et al. . |
| 5,990,465 * | 11/1999 | Nakaoka et al. .................... 219/629 |

FOREIGN PATENT DOCUMENTS

| | | |
|---|---|---|
| 0 363 066 | 4/1990 | (EP) . |
| 1.148.889 | 12/1957 | (FR) . |
| 1035225 | 7/1966 | (GB) . |
| 80201560 | 11/1991 | (TW) . |
| WO97/11578 | 3/1997 | (WO) . |

OTHER PUBLICATIONS

European Search Report for corresponding European Patent Application No. 98102775.8 dated Oct. 1, 1998.

* cited by examiner

*Primary Examiner*—Philip H. Leung
(74) *Attorney, Agent, or Firm*—Ratner & Prestia

(57) ABSTRACT

A heating apparatus includes a heating element having a conductor, at least a part of which is an electrically closed circuit along which an eddy current flows; a container for accommodating the heating element; a magnetic field induction section for induction-heating the heating element; and a high frequency power supply device for supplying high frequency power to the magnetic field induction section. The heating element is induction-heated by an AC magnetic field generated by the magnetic field induction section.

20 Claims, 26 Drawing Sheets

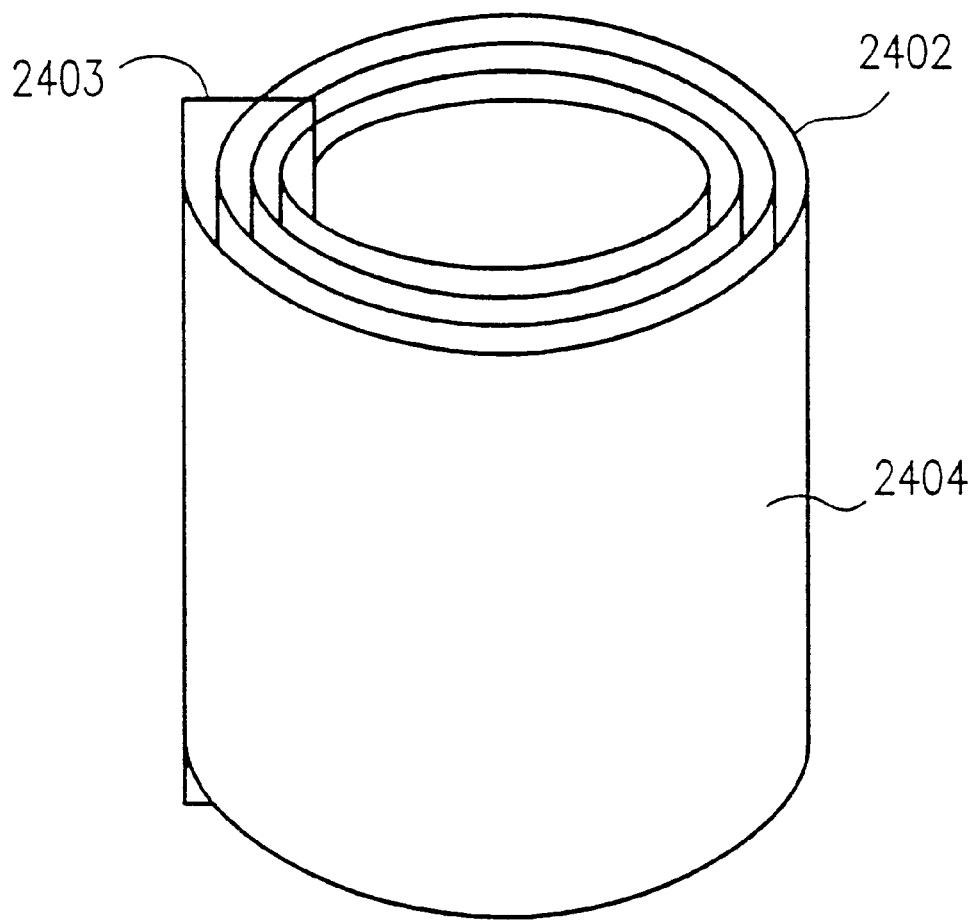

INDUCTION HEATING OF HEATING ELEMENT

BACKGROUND OF THE INVENTION

1. Field of the Invention

The present invention relates to a heating apparatus for heating a gas, a liquid, a solid and the like.

2. Description of the Related Art

Conventionally, heating systems for heating by gas, such as instantaneous water heaters, have been used in order to rapidly raise the temperature of a liquid. In order to heat a solid, metal sheathed tubular elements have been used, for example.

When water is rapidly heated by a conventional instantaneous water heater, the temperature of a heat transfer surface to water exceeds a boiling point due to an excessive calory density. Thus, local boiling is easy to generate, which results in poor safety.

In order to avoid local boiling, a heat exchange area needs to be increased, but an increased heat exchange area enlarges the heating apparatus because of the structure of the combustion section.

Moreover, heating by gas, which is performed from outside a pipe through which water flows, has a low thermal efficiency.

In the case of an electric water heater, a local abnormal temperature rise is easily generated due to an excessive electricity density. This type of water heater also has problems of a low level of safety at the time of and disconnection of the heater. Accordingly, the electric water heater is not suitable to boil water to a temperature close to a boiling point.

In the case where a solid having poor thermal transfer is heated by metal sheathed tubular elements, the temperature is excessively raised only in a portion opposed to the metal sheathed tubular elements, which acts as a heat source.

In the case where the heat exchange surface is increased in order to avoid generation of local heating, the heating apparatus is enlarged and also the heat capacity of the heater is increased. Thus, the temperature response is deteriorated.

In a heating apparatus for heating and thus recovering an adsorbent such as active carbon or zeolite, it is necessary to increase the heat exchange area so as to increase the surface to contact the adsorbent. When a conventional electric heater is used, the heating apparatus is enlarged and the recovering efficiency is low due to the non-uniform temperature of the electric heater.

In a conventional heating apparatus for heating water to generator vapor, the rise is slow and the energy efficiency is low since the water in the reservoir is heated. In a structure in which vapor is instantaneously generated, the heat exchange area needs to be increased, and thus the heating apparatus is enlarged.

When a conventional electric heater is used in a heating apparatus for purifying the air using a catalyst, the effective reaction area cannot be increased due to a limit in the thermal transfer in the carrier (catalyst). Accordingly, the purifying capability is low.

Furthermore, a conventional heating apparatus requires a thermostat and a temperature fuse to be installed in the vicinity of the heat source, resulting in a complicated structure of the heating apparatus.

A conventional electric water heater further has the problem in that scale is accumulated on the surface of the heater and thus abnormal heating disconnects a part of the electric heater to which the scale adheres.

SUMMARY OF THE INVENTION

A heating apparatus according to the present invention includes a heating element having a conductor, at least a part of which is an electrically closed circuit along which an eddy current flows; a container for accommodating the heating element; a magnetic field induction section for induction-heating the heating element; and a high frequency power supply device for supplying high frequency power to the magnetic field induction section. The heating element is induction-heated by an AC magnetic field generated by the magnetic field induction section.

In one embodiment of the invention, the conductor of the heating element has a total thickness which is suitable for generating an electromotive force to cause the eddy current to flow along the closed circuit. The total thickness will be defined later.

In one embodiment of the invention, the conductor of the heating element is wound in one of a circumferential state and a spiral state.

In one embodiment of the invention, the heating element includes a plurality of non-magnetic metal bodies arranged concentrically.

In one embodiment of the invention, the heating element includes at least one non-magnetic metal body and at least one magnetic metal body provided inside the at least one non-magnetic metal body, the metal bodies being concentrically provided.

In one embodiment of the invention, the heating apparatus includes a plurality of heating elements arranged in the container.

In one embodiment of the invention, the conductor of the heating element is processed to be wave-like.

In one embodiment of the invention, the heating apparatus further includes an adsorbent provided in a gap between overlapping parts of the conductor.

In one embodiment of the invention, the heating apparatus further includes a moisture-adsorbing material provided in a gap between overlapping parts of the conductor.

In one embodiment of the invention, the heating apparatus further includes a material having a moisture maintenance capability provided in a gap between overlapping parts of the conductor.

In one embodiment of the invention, the heating apparatus further includes a catalyst on the conductor.

In one embodiment of the invention, the conductor has a hole.

In one embodiment of the invention, the conductor has a wing in the vicinity of the hole for transferring a fluid from one surface of the conductor to another surface of the conductor.

In one embodiment of the invention, the conductor is porous.

In one embodiment of the invention, the container allows a fluid to pass through a part of the container involved in heat exchange.

In one embodiment of the invention, the heating element has a closed circuit which is disconnected when the heating element reaches a prescribed temperature.

In one embodiment of the invention, the conductor is formed of a material having a thermal dependent resistance.

In one embodiment of the invention, the conductor is formed of a material memorizing a prescribed shape and recoverable to the prescribed shape in accordance with a temperature.

In one embodiment of the invention, the heating apparatus further includes a spring for restricting a shape change of the conductor.

In one embodiment of the invention, the magnetic field induction section includes a coil provided on an outer surface of the container. The coil has a greater number of windings per unit length in an area in the vicinity of an end of the coil than an area at a center of the coil.

In one embodiment of the invention, the magnetic field induction section includes a coil having two ends provided on an outer surface of the container. The coil has a greater number of windings per unit length in an area in the vicinity of one end of the coil than in an area in the vicinity of another end of the coil.

Thus, the invention described herein makes possible the advantage of providing a heating apparatus having satisfactory controllability and a sufficiently high thermal efficiency using a heating element having a sufficiently large heat exchange area and performing uniform heating.

This and other advantages of the present invention will become apparent to those skilled in the art upon reading and understanding the following detailed description with reference to the accompanying figures.

BRIEF DESCRIPTION OF THE DRAWINGS

FIG. 15 is a perspective view of a heating element of a heating apparatus in a ninth example according to the present invention.

DESCRIPTION OF THE PREFERRED EMBODIMENTS

Hereinafter, the present invention will be described by way of illustrative examples with reference to the accompanying drawings.

EXAMPLE 1

Figure 1:
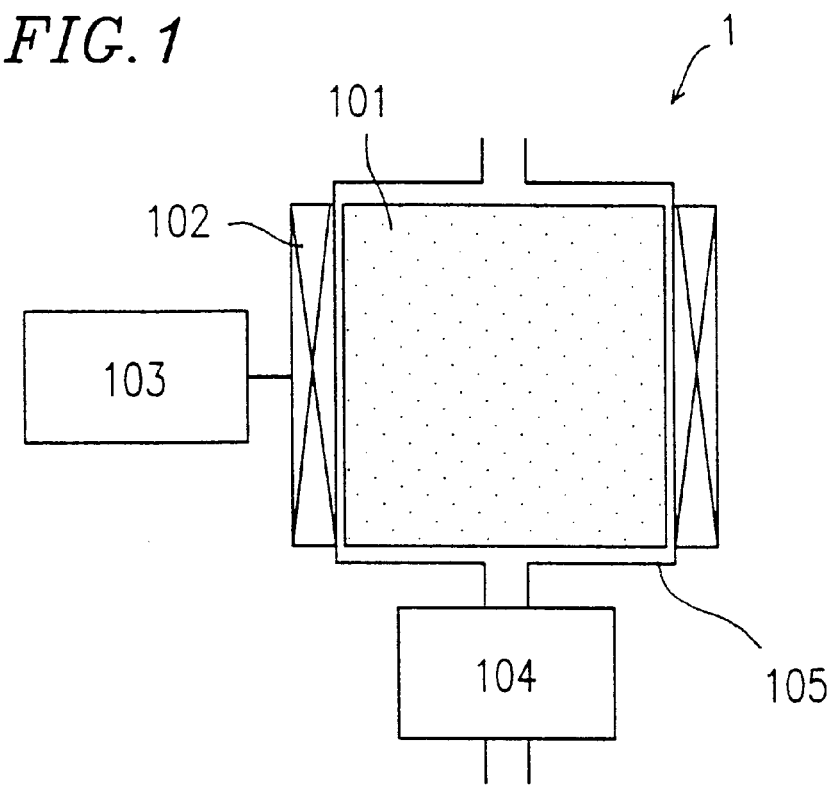
FIG. 1 is a schematic view of a heating apparatus in a first example according to the present invention.

FIG. 1 is a schematic view of a heating apparatus 1 in a first example according to the present invention.

As shown in FIG. 1, the heating apparatus 1 includes a heating element 101 having a conductor formed of, for example, a metal material. At least a part of the conductor forms an electrically closed circuit, and an eddy current flows along the closed circuit. The heating apparatus 1 further includes an induction heating coil 102 for induction-heating the heating element 101, a high frequency power supply device 103 for supplying high frequency power to the induction heating coil 102, a fluid transfer device 104 for transferring a fluid such as, for example, gas, liquid or particles to the heating element 101, and a container 105 for accommodating the heating element 101.

For example, the conductor in the heating element 101 is formed of a stainless steel plate, the high frequency power supply device 103 includes an inverter circuit, and the fluid transfer device 104 includes a pump or a fan.

The heating apparatus 1 operates, for example, in the following manner.

When heating starts by an instruction of a user, the fluid transfer device 104 supplies a fluid to the container 105. The fluid flows in the vicinity of the heating element 101 in the container 105 and is discharged from the container 105. In parallel, the high frequency power supply device 103 supplies high frequency power to the induction heating coil 102, and thus causes a high frequency AC magnetic field to be generated from the induction heating coil 102. The high frequency AC magnetic field generates an eddy current in the conductor in the heating element 101, and the eddy current and an electric resistance in the conductor generate Joule heat in the heating element 101. The Joule heat is transferred to the fluid in the container 105. Since the heating element 101 is buried in the fluid at this point, the thermal efficiency is as high as 100% in the steady state.

Figure 2A:
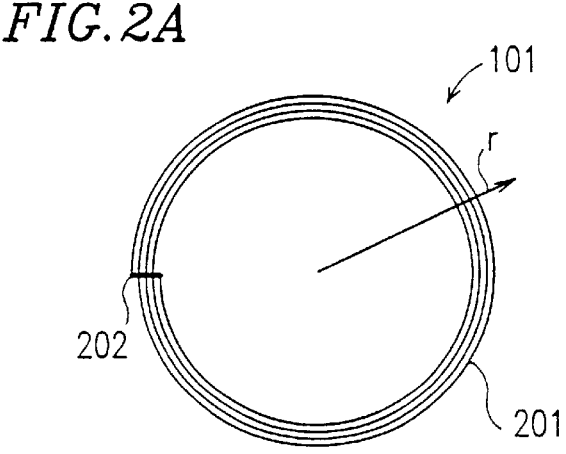
FIGS. 2A, 2B and 2C are respectively a top view, a side view and a perspective view of a heating element usable in the heating apparatus shown in FIG. 1.
Figure 2B:
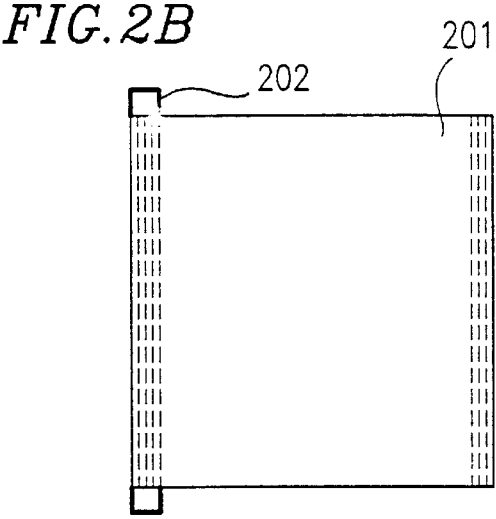
Figure 2C:
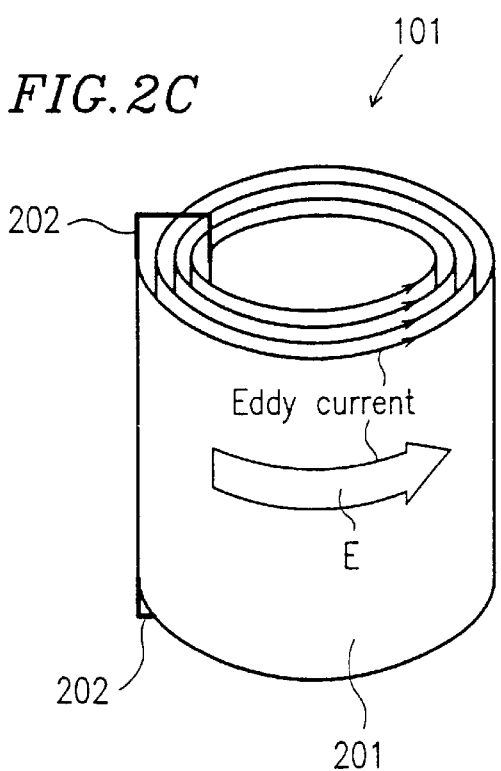

FIGS. 2A, 2B and 2C show an example of the heating element 101. The heating element 101 includes a stainless steel plate 201 which is circumferentially wound upon itself so as to have a cylindrical shape and a connector 202 for connecting both of two ends of the stainless steel plate 201 to each other. Since the stainless steel plate 201 and the connector 202 form an electrically closed circuit, a uniform eddy current flows in the stainless steel plate 201 in a circumferential direction as indicated by arrow E in FIG. 2C. As a result, the stainless steel plate 201 generates heat uniformly. In the case where the distance between overlapping parts of the stainless steel plate 201 is reduced, the heating element 101 as a heat source has an increased heat exchange area per unit volume and generates heat more uniformly.

Next, the thickness of the conductor of the heating element 101 (the stainless steel 201 in this example) will be described.

The magnetic flux generated by the induction heating concentrates in a surface of the conductor in which the eddy current flows due to a phenomenon referred to as the skin effect. The skin depth δ, at which the magnetic flux is (1-1/e) with respect to the magnetic flux at the surface (e: natural logarithm) is represented by the formula:

$$\delta = (2\rho/(\omega \cdot \mu))^{1/2}$$

where ρ represents the volumetric resistance, ρ represents the angular frequency, and μ represents the magnetic permeability.

An electromotive force for starting the eddy current for performing induction heating is not generated unless the magnetic flux passes through the conductor. Therefore, the skin depth is a criterion for performing induction heating.

Accordingly, by setting a total thickness of the overlapping parts of the stainless steel 201 to be smaller than the skin depth, the magnetic flux is efficiently utilized, so that an eddy current is generated in each of the overlapping parts of the stainless steel 201. In this specification, the expression "total thickness" refers to a sum of thicknesses of the overlapping parts of a conductor in a direction r in FIG. 2A.

For example, when a non-magnetic stainless steel plate having a thickness of 0.3 mm is used for the conductor, the skin depth is about 3 mm in the vicinity of the frequency of 20 kHz of the high frequency AC magnetic field. Thus, the winding number of the stainless steel plate is appropriately up to about 10.

In this example, the stainless steel plate 201, which is circumferentially wound upon itself so as to have a cylindrical shape, which has an appropriate thickness, and which has two ends connected to each other by the connector 202, forms an electrically closed circuit in the heating element 101. Thus, even when the stainless steel plate 201 is formed of a non-magnetic stainless steel plate, which is generally easily available, a sufficiently large and uniform eddy current flows in the heating element 101.

Figure 3:
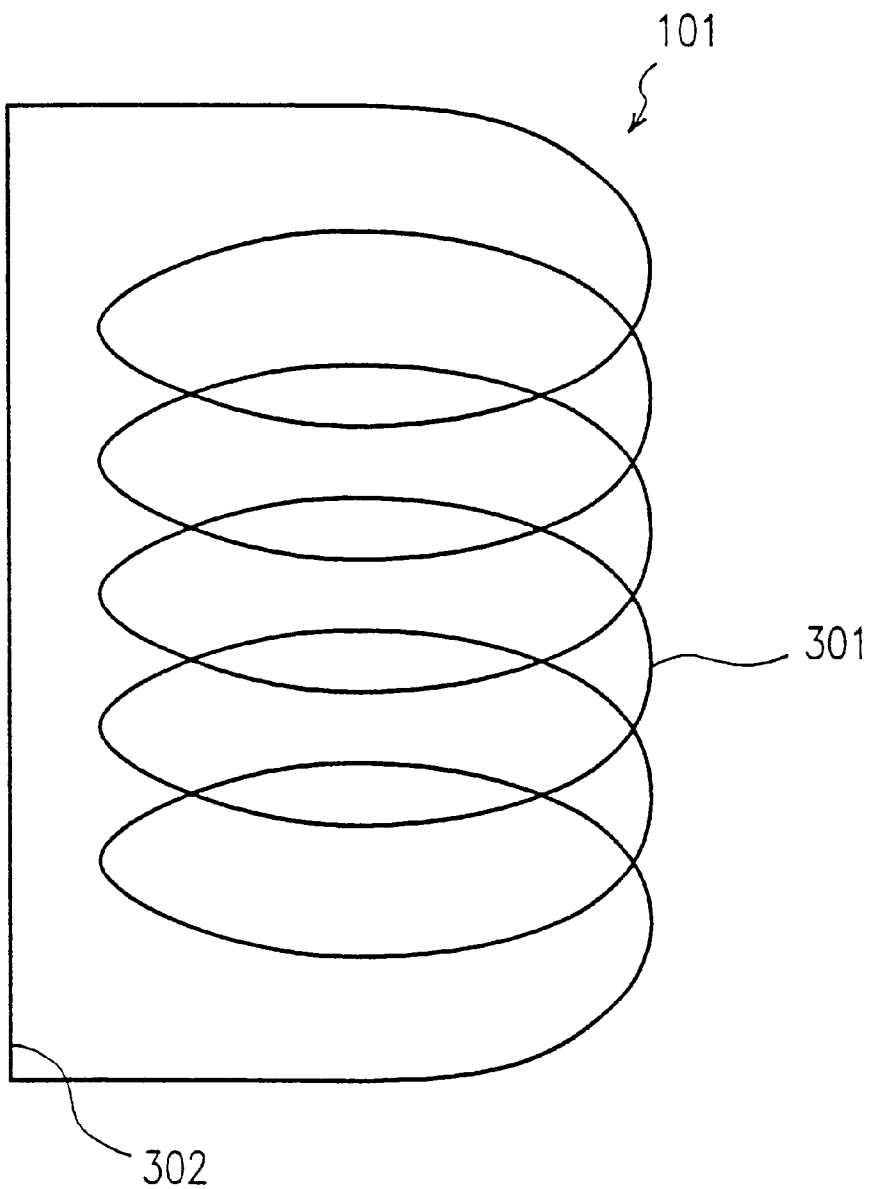
FIG. 3 is a schematic view of another example of the heating element usable in the heating apparatus shown in FIG. 1.

FIG. 3 shows another example of the heating element 101. The heating element 101 includes a stainless steel wire 301 which is spirally wound and a connector 302 for connecting both of two ends of the stainless steel wire 301 to each other. The stainless steel wire 301 and the connector 302 form an electrically closed circuit. In the case where the heating element 101 is enclosed by a cylindrical solenoid having a limited length, the magnetic flux density of the solenoid in an axial direction is low in the vicinity of an opening of the solenoid and high in the vicinity of a center of the solenoid. However, both ends of the stainless wire 301 are electrically connected to each other by the connector 302 in this example. Accordingly, even though the magnetic flux density is not uniform in the axial direction of the heating element 101, the amount of the electric current is uniform and the amount of heat generated is the same throughout the heating element 101.

As described above, the heating apparatus 1 in the first example according to the present invention has a sufficiently large heat exchange area per unit volume and heats a fluid uniformly. Even when the heating element 101 has a relatively small volume, the liquid can be heated to a temperature close to the boiling point, and the heat exchange efficiency is sufficiently high.

Figure 4A:
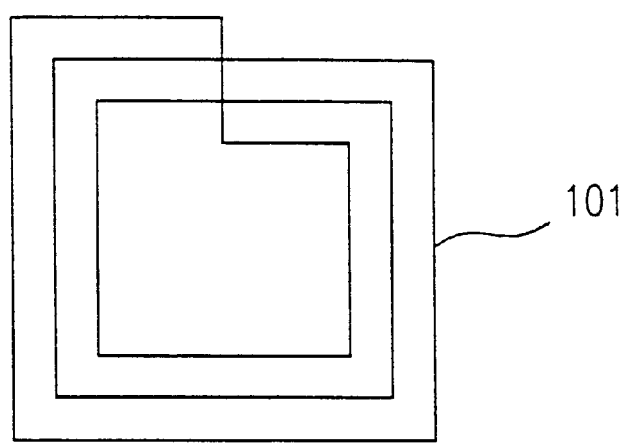
FIGS. 4A, 4B and 4C are top views of modifications of the heating element in the heating apparatus shown in FIG. 1.
Figure 4B:
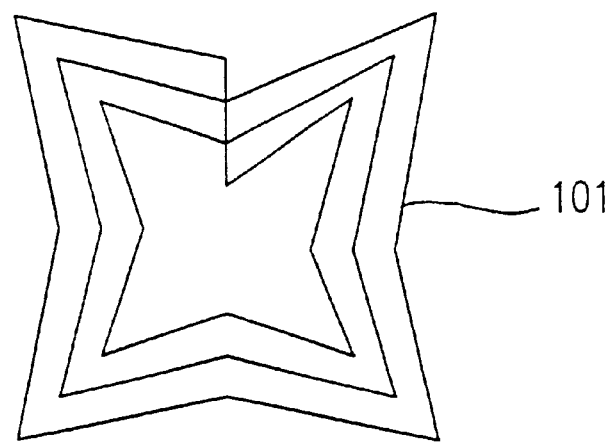
Figure 4C:
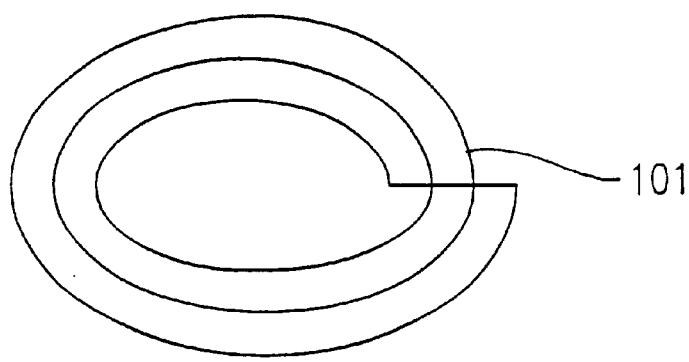

In the first example, the conductor of the heating element 101 is formed of stainless steel. The conductor can be formed of any other material which generates an eddy current. Although the conductor is circumferentially or spirally wound to have a substantially circular cross section in the first example, the conductor can also be circumferentially or spirally wound to have a substantially rectangular (FIG. 4A), polygon (FIG. 4B) or elliptical (FIG. 4C) cross section. The entirety of the heating element 101 can have any shape as long as a part of the heating element 101 forms a closed circuit.

Figure 5:
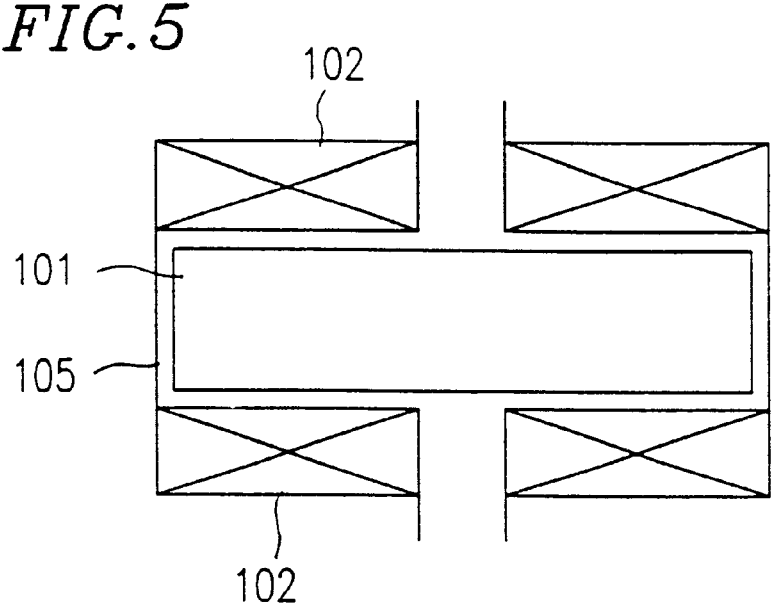
FIG. 5 is a schematic view of a modification of the heating apparatus shown in FIG. 1.

In the first example, the induction heating coil 102 (FIG. 1) is located outside the heating element 101. Alternatively, the induction heating coil 102 can be located inside the heating element 101 or located above and below the heating element 101 (FIG. 5).

The fluid to be heated can be a liquid such as, for example, water or oil, or a gas. This also applies to the following examples.

EXAMPLE 2

Figure 6A:
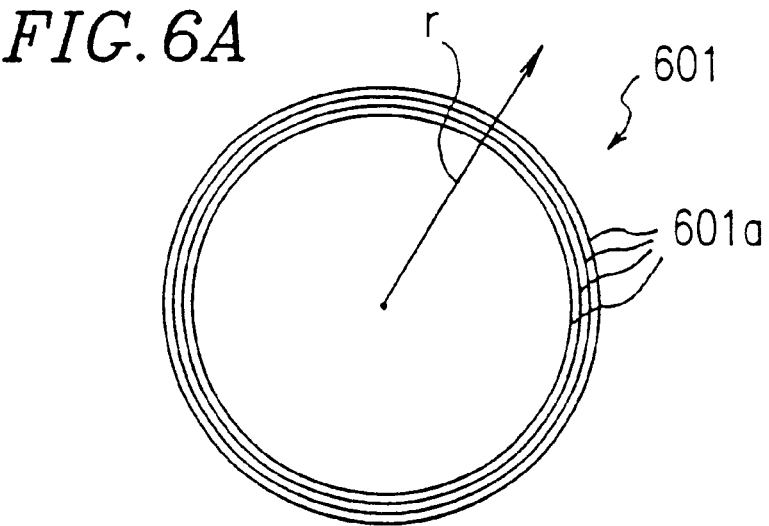
FIGS. 6A and 6B are respectively a top view and a side view of a heating element of a heating apparatus in a second example according to the present invention.
Figure 6B:
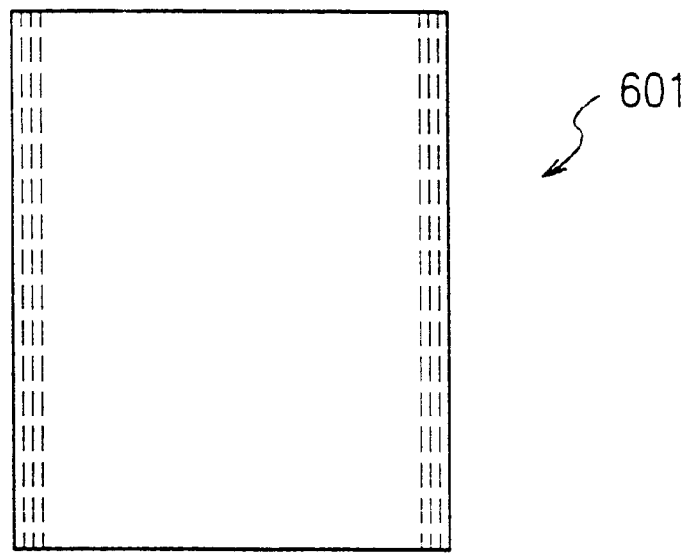

FIGS. 6A and 6B are respectively a top view and a side view of a heating element 601 of a heating apparatus in a second example according to the present invention. The heating element 601 includes a plurality of cylindrical plates 601a formed of non-magnetic stainless steel and located concentrically. The plurality of cylindrical plates 601a are conductors forming closed circuits.

The heating apparatus in the second example has a structure shown in FIG. 1 with the heating element 101 in the container 105 being replaced by the heating element 601 shown in FIGS. 6A and 6B.

The heating apparatus in the second example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in each cylindrical plate 601*a* in the heating element 601, and the eddy current and an electric resistance in the cylindrical plate 601*a* generate Joule heat in each cylindrical plate 601*a*.

For the reason described in the first example, in the case where the total thickness of the cylindrical plates 601*a* in a direction r in FIG. 6A is sufficiently smaller than the skin depth δ, each cylindrical plate 601*a* efficiently generates heat and thus uniform heat generation distribution in the heating element 601 is obtained. By increasing the number of the cylindrical plates 601*a*, the heat exchange area is increased.

In the second example, a simple shape and a simple structure in which a plurality of cylindrical non-magnetic stainless steel plates 601*a* are located concentrically increases the heat exchange area per unit volume. In this example, a heating apparatus, which can heat a liquid to a temperature close to a boiling point and has a sufficiently high heat exchange efficiency, can be produced at a relatively low cost.

The conductor can be formed of any other non-magnetic material in lieu of stainless steel.

In the case where the thickness of the cylindrical plates 601*a* is gradually reduced from the outermost plate toward the innermost plate, the cross-sectional areas of the inner plates are smaller than those of the outer plates. Accordingly, the amount of the heat generated by the inner plates is raised. This compensates for the reduction in the heat generated by the inner plates which is caused by the lower magnetic density in the inner plates. Thus, the heat generation distribution becomes more uniform.

EXAMPLE 3

Figure 7A:
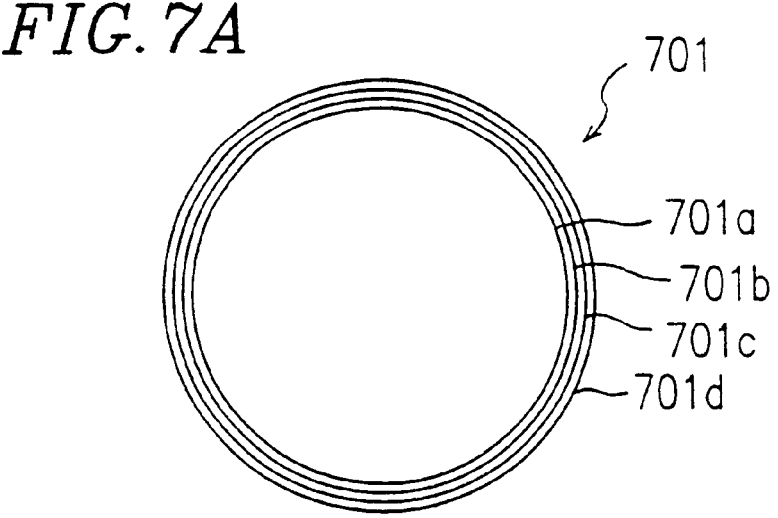
FIGS. 7A and 7B are respectively a top view and a side view of a heating element of a heating apparatus in a third example according to the present invention.
Figure 7B:
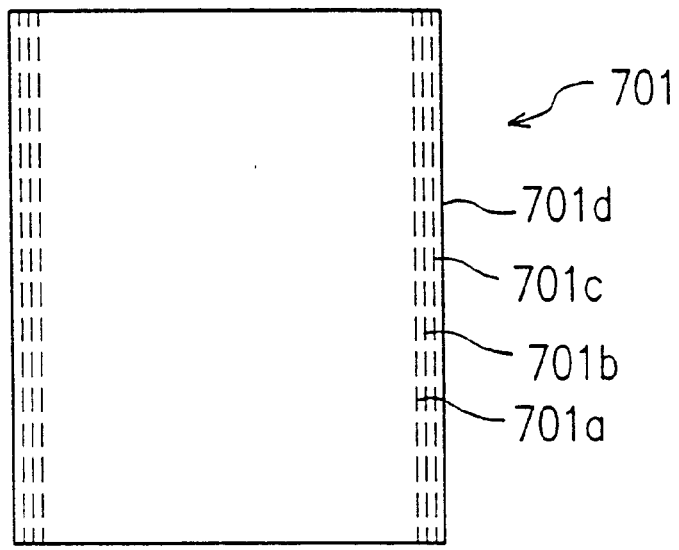

FIGS. 7A and 7B are respectively a top view and a side view of a heating element 701 of a heating apparatus in a third example according to the present invention. The heating element 701 includes a plurality of cylindrical plates 701*a*, 701*b* and 701*c* and 701*d* which are located concentrically. The plurality of cylindrical plates 701*a* through 701*d* are conductors forming closed circuits.

The innermost cylindrical plate 701*a* is formed of magnetic stainless steel, and the other cylindrical plates 701*b*, 701*c* and 701*d* are formed of non-magnetic stainless steel.

The heating apparatus in the third example has a structure shown in FIG. 1 with the heating element 101 in the container 105 being replaced by the heating element 701 shown in FIGS. 7A and 7B.

The heating apparatus in the third example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in each of the cylindrical plates 701*a* through 701*d* in the heating element 701, and the eddy current and an electric resistance in each of the plates 701*a* through 701*d* generate Joule heat in each of the plates 701*a* through 701*d*.

For the reason described in the first example, in the case where the total thickness of the cylindrical plates 701*a* through 701*d* is sufficiently smaller than the skin depth δ, the cylindrical plates 701*a* through 701*d* each efficiently generate heat and thus uniform heat generation distribution in the heating element 701 is obtained. By increasing the number of the cylindrical plates 701*a* through 701*d*, the heat exchange area is increased.

The eddy current caused to flow in the heating element 701 by the high frequency magnetic field generated from the induction heating coil 102 flows in such a direction as to prevent a change in the magnetic flux. Accordingly, a larger eddy current is generated in a portion where more magnetic flux passes. The magnetic permeability (which indicates how easy the magnetic flux passes) of magnetic stainless steel is about 100 times that of non-magnetic stainless steel. Thus, the innermost cylindrical plate 701*a* formed of magnetic stainless steel provides easier passage for the magnetic flux and generates an eddy current more easily than the other cylindrical plates.

Figure 8:
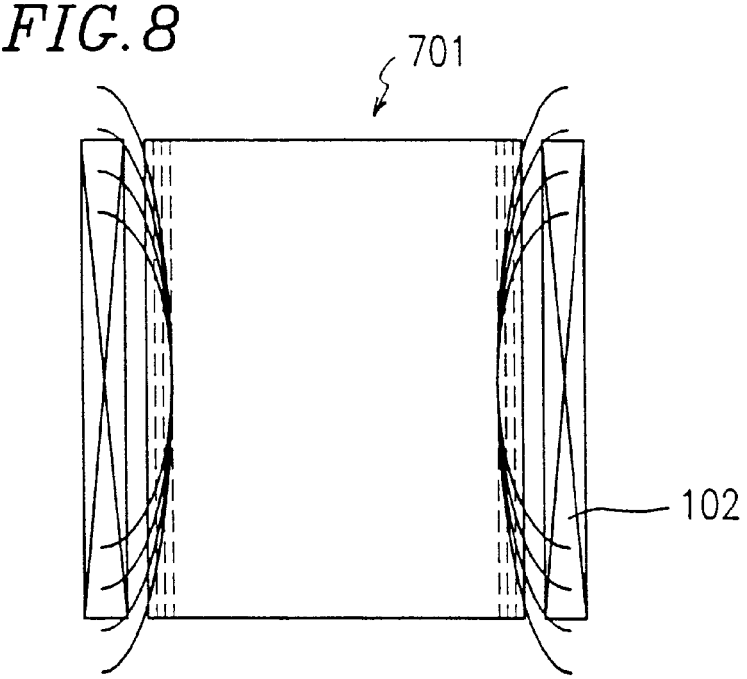
FIG. 8 is a view illustrating a magnetic flux distribution in the heating apparatus in the third example.

The magnetic flux generated from the induction heating coil 102 is not parallel to the axial direction of the container 105. As schematically shown in FIG. 8, the magnetic flux passes elliptically or parabolically. Accordingly, the magnetic flux crosses all the cylindrical plates 701*a* through 701*d* and thus causes all the cylindrical plates 701*a* through 701*d* to generate heat.

Since the innermost cylindrical plate 701*a* provides the easiest passage for the magnetic flux and generates an eddy current most easily as described above, the temperature of a central part of the heating element 701 is higher than the rest thereof. Such a temperature difference is specifically effective in the case where, for example, the fluid to be heated has a high viscosity, such as, for example, oil. Considering that the fluid passes through the central part faster than the rest of the heating element 701, the temperature distribution of the container 105 is uniformized by setting the temperature of the central portion higher than the rest of the heating element 701.

Although the heating element 701 includes four cylindrical plates 701*a* through 701*d*, the number is not limited to this. The cylindrical plates can be formed of any other material as long as the inner plate or plates have a higher magnetic permeability than that of the outer plates.

EXAMPLE 4

Figure 9:
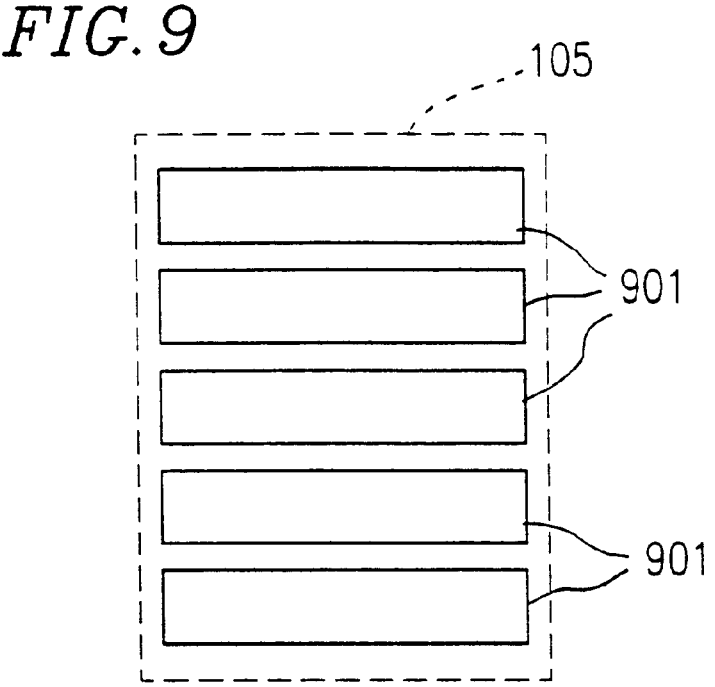
FIG. 9 is a plan view of a plurality of heating elements included in a heating apparatus in a fourth example according to the present invention.

FIG. 9 is a plan view of a plurality of heating elements 901 included in a heating apparatus in a fourth example according to the present invention. The heating elements 901 are arranged in parallel in the container 105. Each of the heating elements 901 can have any structure which at least partially contains an electrically closed circuit along which an eddy current flows. Any of the heating elements described in the first through third examples is applicable to the heating element 901, as long as the height thereof is reduced so that the plurality of heating elements 901 are accommodated in the container 105.

The heating apparatus in the fourth example has a structure shown in FIG. 1 with the heating element 101 in the container 105 being replaced by the heating elements 901 shown in FIG. 9.

The heating apparatus in the fourth example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in each of the heating element 901, and the eddy current and an electric resistance in each heating element 901 generate Joule heat in each heating element 901. In order to utilize the magnetic flux as efficiently as possible, it is desirable that the total thickness of the conductor in each heating element is set to be smaller than the skin depth.

Although five heating elements 901 are provided in FIG. 9, the number of heating elements 901 can be increased or decreased in accordance with the purpose of use of the heating apparatus, so that the heat exchange area and the amount of heat generated per unit area are set appropriately.

For example, the heating apparatus can be used for heating water to a temperature of up to 50° C. so that the water is used in contact with a human body such as, for example, in a bathroom, for a shower, or in a toilet. In such a case, the number of the heating elements 901 is decreased to reduce the volume of the water passage, so that the temperature controllability is raised. Thus, an easy-to-use heating apparatus is obtained.

In the case where the heating apparatus is used to heat water to a temperature close to the boiling point, the number of the heating elements 901 is increased to enlarge the heat exchange area. Thus, the water is heated safely without boiling. In order to realize a heating apparatus for receiving a higher level of input power, the number of the heating elements 901 is further increased.

The heating elements 901 can have any appropriate shape. The plurality of heating elements 901 can generate different amounts of heat.

EXAMPLE 5

Figure 10:
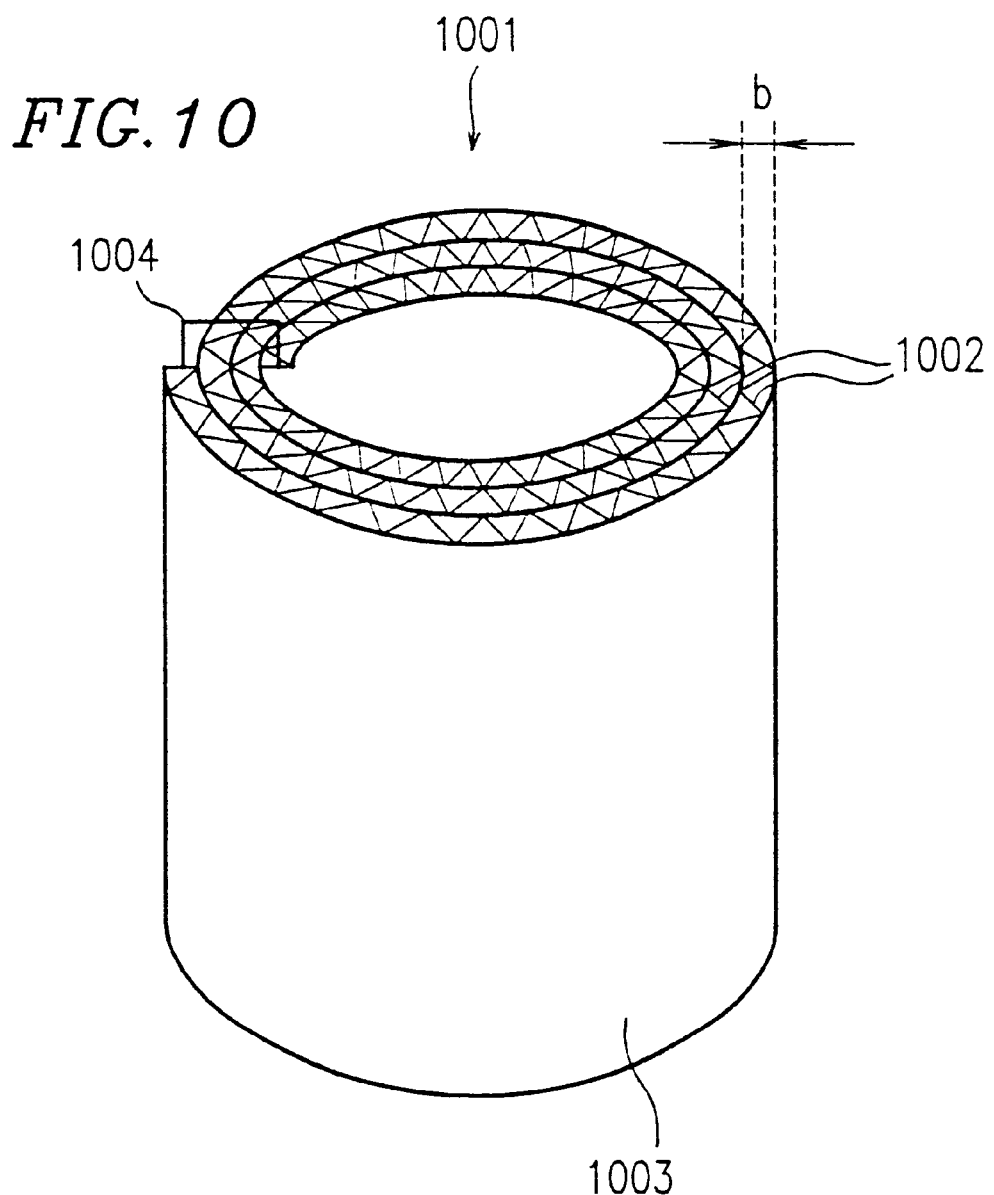
FIG. 10 is a perspective view of a heating element of a heating apparatus in a fifth example according to the present invention.

FIG. 10 is a perspective view of a heating element 1001 of a heating apparatus in a fifth example according to the present invention. The heating element 1001 includes a conductor 1002 formed of, for example, a metal material treated to be wave-like and circumferentially wound upon itself so as to have a cylindrical shape, a connector 1004 for connecting both of two ends of the conductor 1002, and an insulative sheet 1003 inserted between overlapping parts of the conductor 1002. The conductor 1002 and the connector 1004 form a closed circuit.

The heating apparatus in the fifth example has a structure shown in FIG. 1 with the heating element 101 in the container 105 being replaced by the heating element 1001 shown in FIG. 10.

The heating apparatus in the fifth example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in the heating element 1001, and the eddy current and an electric resistance in the heating element 1001 generate Joule heat in the heating element 1001. In order to utilize the magnetic flux as efficiently as possible, it is desirable that the total thickness of the conductor 1002 is set to be smaller than the skin depth.

The wave-like conductor 1002 used in the fifth example has a larger heat exchange area per unit volume than a conductor formed by rolling a flat plate. Thus, the heat exchange efficiency is further enhanced. The wave-like conductor 1002 also allows a gap b between overlapping parts of the conductor 1002 to be kept appropriately simply by inserting the insulative sheet 1003 therebetween, without any other special device.

Alternatively, a plurality of wave-like conductors can be arranged concentrically with an insulative sheet being inserted therebetween.

EXAMPLE 6

Figure 11:
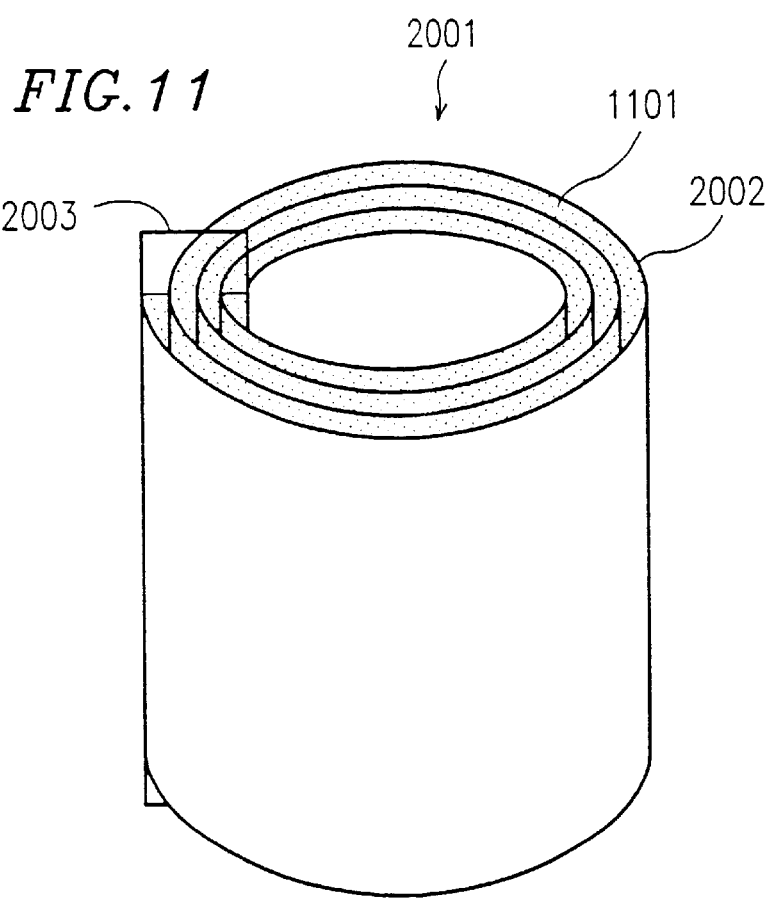
FIG. 11 is a perspective view of a heating element of a heating apparatus in a sixth example according to the present invention.

FIG. 11 is a perspective view of a heating element 2001 of a heating apparatus in a sixth example according to the present invention. The heating element 2001 includes a stainless steel plate 2002 which is circumferentially wound upon itself so as to have a cylindrical shape, a connector 2003 for connecting both of two ends of the stainless steel plate 2002, and an active carbon 1101 inserted between overlapping parts of the stainless steel plate 2002. The stainless steel plate 2002 acts as a conductor, which forms a closed circuit together with the connector 2003.

The heating apparatus in the sixth example has a structure shown in FIG. 1 with the heating element 101 in the container 105 being replaced by the heating element 2001 shown in FIG. 11.

The heating apparatus in the sixth example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in the heating element 2001, and the eddy current and an electric resistance in the heating element 2001 generate Joule heat in the heating element 2001. In order to utilize the magnetic flux as efficiently as possible, it is desirable that the total thickness of the conductor is set to be smaller than the skin depth.

The heating apparatus in the sixth example can be used for heating water. Water is caused to flow through the heating element 2001 and trihalomethane contained in the water is adsorbed by the active carbon 1101. However, the adsorbing force (adsorbing capability) of the active carbon 1101 rapidly decreases as the total amount of water which has passed through the heating element 2001 increases. In order to recover the adsorbing force of the active carbon 1101, the active carbon 1101 is heated when the total amount of water which has passed through the heating element 2001 reaches a prescribed level. Thus, trihalomethane is released together with vapor, and the adsorbing force of the active carbon 1101 is recovered. This is referred to as "heating recovery".

Figure 12:
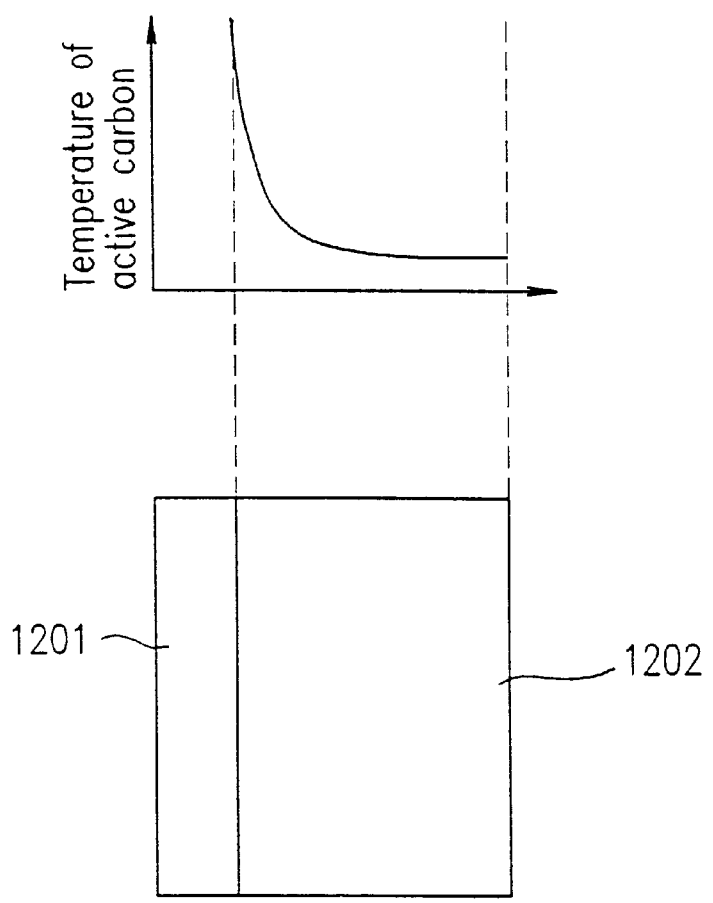
FIG. 12 is a view showing the relationship between the temperature increase and the distance of an active carbon from metal sheathed tubular elements.

The heating recovery has the problem in that the active carbon 1101 may undesirably heated to an excessively high temperature and fire, when performed using conventional metal sheathed tubular elements or the like. For example, as shown in FIG. 12, when an active carbon piece 1202 is heated where metal sheathed tubular elements heater 1201 exist closer to the active carbon piece 1202, the inner temperature of the active carbon piece 1202 takes longer to increase as the distance between the active carbon piece 1202 and the metal sheathed tubular elements 1201 increases. Thus, a large temperature gradient is generated in the active carbon piece 1202 between a portion close to the metal sheathed tubular elements 1201 and a portion farther from the metal sheathed tubular elements 1201. When the input power to the metal sheathed tubular elements 1201 is raised in order to perform the heating recovery of the active carbon piece 1202 in a shorter time period, only the portion of the active carbon piece 1202 in contact with the metal sheathed tubular elements 1201 may be heated and the temperature of such a portion may undesirably rise to the firing point of the active carbon piece 1202.

However, in the heating apparatus in this example, the heating area per unit volume for heating the active carbon 1101, i.e., the contact area of the active carbon 1101 and the heating element 2001 is sufficiently large to heat the entirety of the active carbon 1101 substantially uniformly. Accordingly, the entirety of the active carbon 1101 is efficiently heated to recovery without raising the temperature of the active carbon 1101 to the firing point.

Using the heating apparatus in this example, a water purifier by which trihalomethane can be continuously removed by the active carbon 1101 is realized.

Although the stainless steel plate 2002 is circumferentially wound upon itself so as to have a cylindrical shape in this example, the stainless steel plate can also be spirally wound or may have any shape described in the second through fifth example. The heating procedure performing to recover the adsorbing force of the active carbon 1101 also sterilizes the active carbon 1101.

EXAMPLE 7

Figure 13:
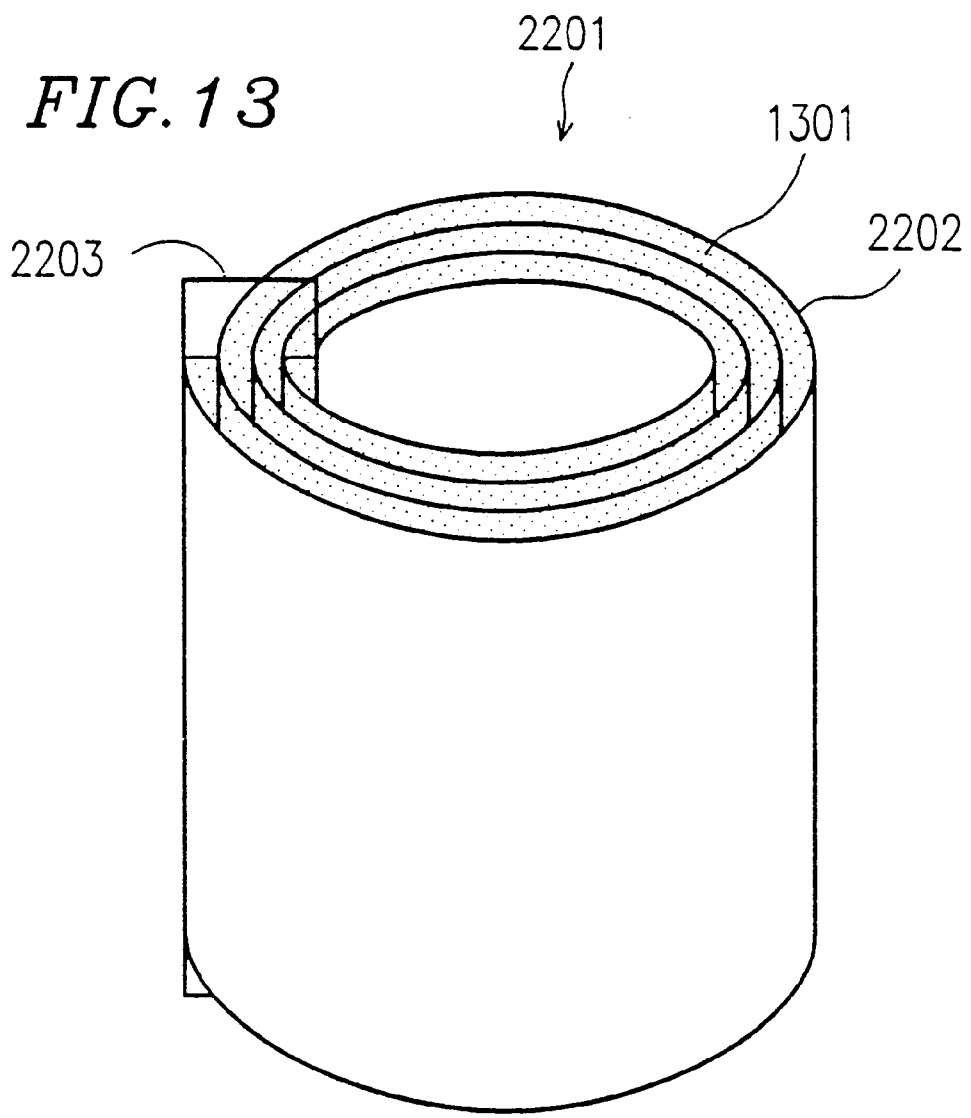
FIG. 13 is a perspective view of a heating element of a heating apparatus in a seventh example according to the present invention.

FIG. 13 is a perspective view of a heating element 2201 of a heating apparatus in a seventh example according to the present invention. The heating element 2201 includes a stainless steel plate 2202 which is circumferentially wound upon itself so as to have a cylindrical shape, a connector 2203 for connecting both of two ends of the stainless steel plate 2202, and a zeolite 1301 inserted between overlapping parts of the stainless steel plate 2202. The stainless steel plate 2202 acts as a conductor, which forms a closed circuit together with the connector 2203.

The heating apparatus in the seventh example has a structure shown in FIG. 1 with the heating element 101 in the container 105 being replaced by the heating element 2201 shown in FIG. 13.

The heating apparatus in the seventh example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in the heating element 2201, and the eddy current and an electric resistance in the heating element 2201 generate Joule heat in the heating element 2201. In order to utilize the magnetic flux as efficiently as possible, it is desirable that the total thickness of the conductor is set to be smaller than the skin depth.

The heating apparatus in the seventh example can be used for heating air. The fluid supply device 104 supplies air to the container 105. Moisture contained in the air is adsorbed by the zeolite 1301 and the air dried in this way is discharged from the container 105. The heating apparatus in this example also acts as an air dryer.

However, the adsorbing force of the zeolite 1301 is limited. In order to recover the adsorbing force of the zeolite 1301, the zeolite 1301 is heated to a temperature above a prescribed level by periodically heating the heating element 2201. Thus, the adsorbed moisture is released as a vapor. This is also referred to as "heating recovery".

When the heating recovery is performed using conventional metal sheathed tubular elements or the like, the following problem occurs. When the input power to the metal sheathed tubular elements is raised in order to perform the heating recovery of the zeolite 1301 in a shorter time period, only a portion of the zeolite in contact with the metal sheathed tubular elements may heated to an excessively high temperature as in the sixth example.

However, in the heating apparatus in this example, the heating area per unit volume for heating the zeolite 1301, i.e., the contact area of the zeolite 1301 and the heating element 2201 is sufficiently large to heat the entirety of the zeolite 1301 substantially uniformly. Accordingly, the entirety of the zeolite 1301 is efficiently heated to recovery without raising the temperature of the zeolite 1301 in contact with the heating element 2201 to an excessively high temperature. The zeolite 1301 is also heated faster.

Although the stainless steel plate 2202 is circumferentially wound upon itself so as to have a cylindrical shape in this example, the stainless steel plate can also be spirally wound or may have any shape described in the second through fifth example.

EXAMPLE 8

Figure 14:
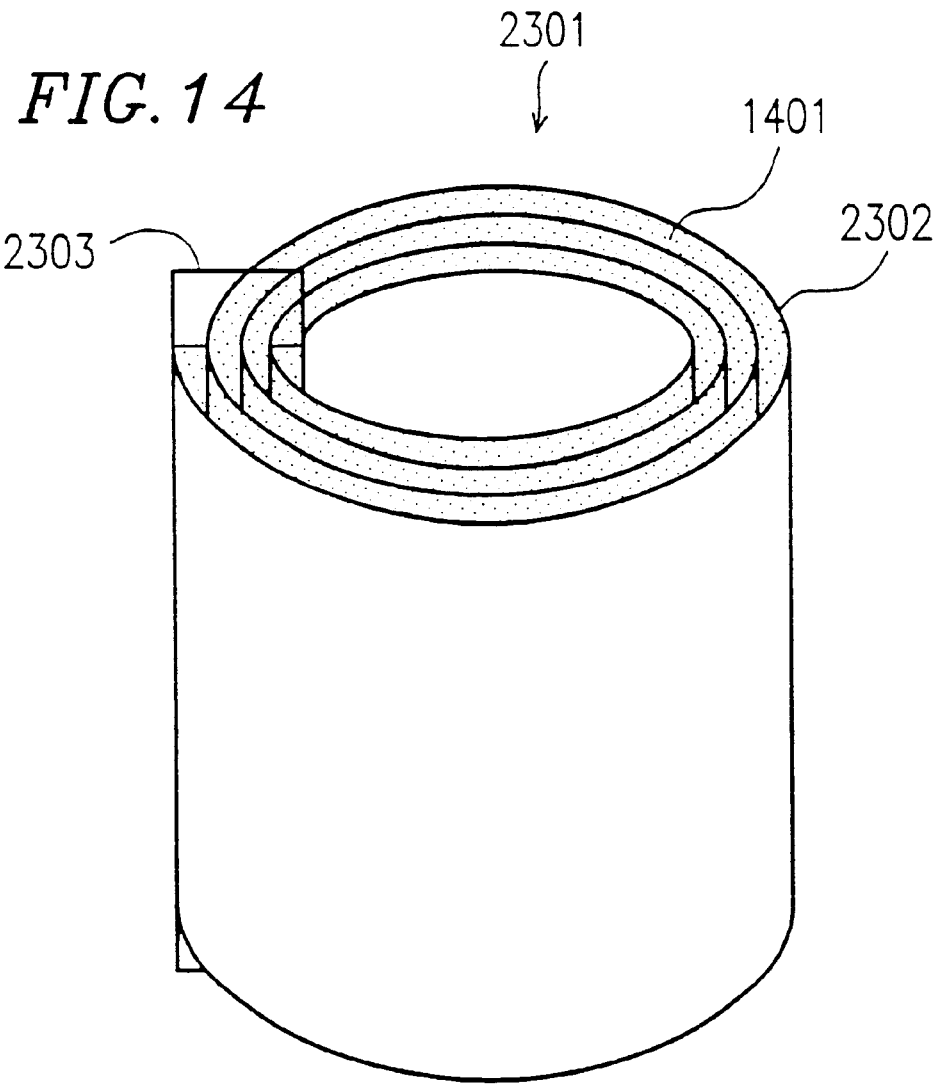
FIG. 14 is a perspective view of a heating element of a heating apparatus in an eighth example according to the present invention.

FIG. 14 is a perspective view of a heating element 2301 of a heating apparatus in an eighth example according to the present invention. The heating element 2301 includes a stainless steel plate 2302 which is circumferentially wound upon itself so as to have a cylindrical shape, a connector 2303 for connecting both of two ends of the stainless steel plate 2302, and a sponge 1401 having a relatively high moisture maintenance capability inserted between overlapping parts of the stainless steel plate 2302. The stainless steel plate 2302 acts as a conductor, which forms a closed circuit together with the connector 2303.

The heating apparatus in the eighth example has a structure shown in FIG. 1 with the heating element 101 in the container 105 being replaced by the heating element 2301 shown in FIG. 14.

The heating apparatus in the eighth example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in the heating element 2301, and the eddy current and an electric resistance in the heating element 2301 generate Joule heat in the heating element 2301. In order to utilize the magnetic flux as efficiently as possible, it is desirable that the total thickness of the conductor is set to be smaller than the skin depth.

The heating apparatus in the eighth example can be used for water. The fluid supply device 104 supplies water to the container 105 in a unit of very small amount. The sponge 1401 absorbs the water and guides the water with no directionality to the stainless steel plate 2302. When the water touches the stainless steel plate 2302 which generates heat, the water is vaporized. Thus, the heating apparatus in this example also acts as a vapor generator.

In the case where the water is directly supplied to the stainless steel plate 2302, the water becomes drops on a surface of the stainless steel plate 2302, which reduces the contact area between the water and the stainless steel plate 2302. The reduced contact area deteriorates the vaporization efficiency.

However, in this example, water contacts the stainless steel plate 2302 while being absorbed in the sponge 1401. Accordingly, the water is put into contact with the entirety of the stainless steel plate 2302, thus enhancing the vaporization efficiency. The heating apparatus in this example can generate vapor in an arbitrary direction without causing the water to drop and thus is convenient when used as a handy vapor generator.

As described above, since a material having a relatively high moisture maintenance capability is inserted into the gap between overlapping parts of the conductor and the heating element 2302 is heated by the induction heating coil 102 (FIG. 1) while the material contains water, vapor is generated in whichever direction the heating element 2302 is directed.

By further heating the vapor, overheated vapor can be generated. This is realized by, for example, providing a heating element excluding a sponge in a subsequent stage of passage of water to the heating element 2301 for further heating the vapor.

EXAMPLE 9

FIG. 15 is a perspective view of a heating element 2401 of a heating apparatus in a ninth example according to the present invention. The heating element 2401 includes a stainless steel plate 2402 which is circumferentially wound upon itself so as to have a cylindrical shape, a connector 2403 for connecting both of two ends of the stainless steel plate 2402, and a platinum catalyst 2404 carried on a surface of the stainless steel plate 2402. The stainless steel plate 2402 acts as a conductor, which forms a closed circuit together with the connector 2403.

The heating apparatus in the ninth example has a structure shown in FIG. 1 with the heating element 101 in the container 105 being replaced by the heating element 2401 shown in FIG. 15.

The heating apparatus in the ninth example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in the heating element 2401, and the eddy current and an electric resistance in the heating element 2401 generate Joule heat in the heating element 2401. In order to utilize the magnetic flux as efficiently as possible, it is desirable that the total thickness of the conductor is set to be smaller than the skin depth.

The heating apparatus in the ninth example can be used in the following manner. First, the heating element 2401 is heated to raise the temperature of the platinum catalyst 2404 on the surface of the stainless steel plate 2402 to the activation point thereof. In this state, the fluid supply device 104 supplies air to the container 105. In the container 105, an odor component such as ammonium contained in the air is oxidized and thus decomposed by the action of the platinum catalyst on the surface of the stainless steel plate 2402.

When the action of catalyst 2404 is obtained using conventional metal sheathed tubular elements or the like, the following problem occurs. When the input power to the metal sheathed tubular elements is raised in order to obtain the action of the catalyst 2404 in a shorter time period, the temperature of the contact area between the catalyst 2404 and the heater becomes excessively high.

However, in the heating apparatus in this example, the contact area of the platinum catalyst 2404 and air is sufficiently large and the heat generation distribution is sufficiently uniform to obtain deodorizing action efficiently without deteriorating the performance of the catalyst 2404 due to a local excessive rise of the temperature. Thus, the high deodorizing capability is maintained.

As described above, due to the heating element 2401 carrying the catalyst 2404, the catalyst 2404 is heated efficiently.

EXAMPLE 10

Figure 16A:
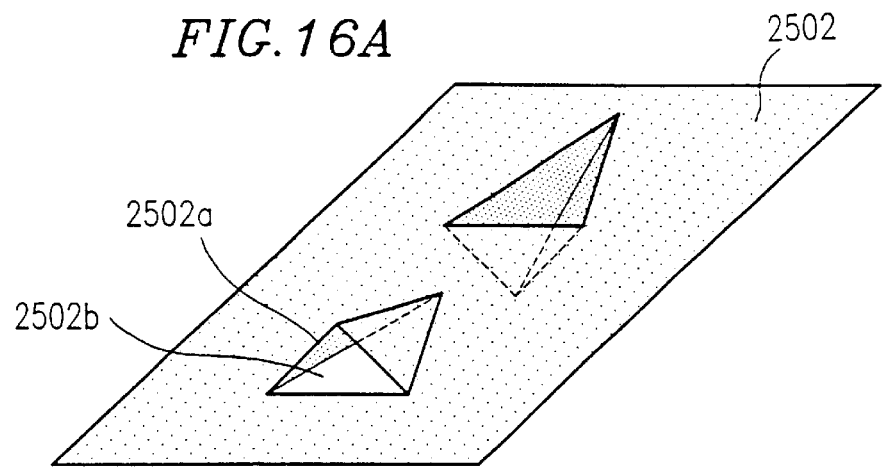
FIG. 16A is an enlarged view of a conductor of a heating element of a heating apparatus in a tenth example according to the present invention.
Figure 16B:
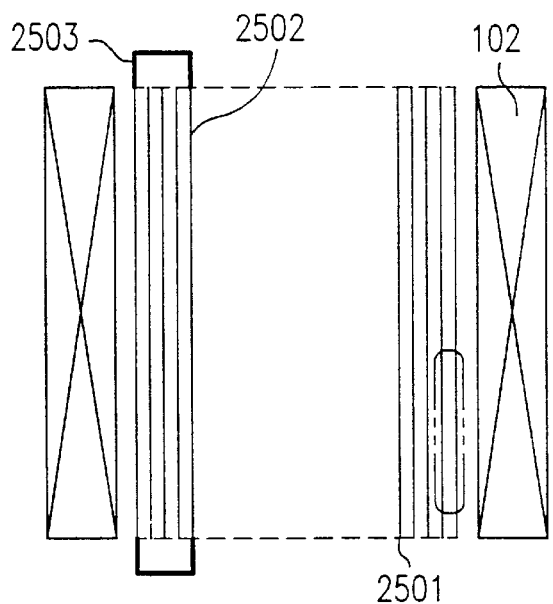
FIG. 16B is a schematic view of the heating element and an induction coil of the heating element in the tenth example.
Figure 16C:
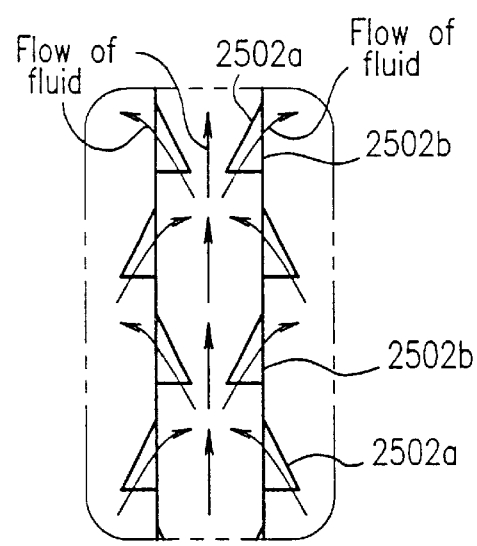
FIG. 16C is a partial enlarged view of the heating element shown in FIG. 16B.

FIG. 16A is an enlarged view of a conductor 2502 of a heating element 2501 of a heating apparatus in a tenth example according to the present invention. FIG. 16B is a schematic view of the heating element 2501 and the induction heating coil 102, and FIG. 16C is a partial enlarge view of the heating element 2501 illustrating the passage of the fluid.

As shown in FIG. 16B, the heating element 2501 includes a conductor 2502 formed of, for example, a metal material and is circumferentially wound upon itself so as to have a cylindrical shape and a connector 2503 for connecting both two ends of the conductor 2502. The conductor 2502 forms a closed circuit together with the connector 2503.

As shown in FIG. 16A, the conductor 2502 has a plurality of wings 2502a and respective holes 2502b.

The heating apparatus in the tenth example has a structure shown in FIG. 1 with the heating element 101 in the container 105 being replaced by the heating element 2501 shown in FIG. 16B.

The heating apparatus in the tenth example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in the heating element 2501, and the eddy current and an electric resistance in the heating element 2501 generate Joule heat in the heating element 2501. In order to utilize the magnetic flux as efficiently as possible, the total thickness of the conductor 2502 is appropriately set.

Due to the holes 2502b and the wings 2502a, the fluid is guided by the wings 2502a while passing through the vicinity of the conductor 2502 and flows from one surface to the other surface of the conductor 2502 through the holes 2502b.

As a result, the flow of the fluid is complicated and thus contacts the heat exchange surface of the heating element 2501 in a larger area. Accordingly, the heat exchange efficiency is enhanced. Moreover, due to the flow disturbance, the fluid is sufficiently mixed and the temperature of the entirety of the fluid is uniformized.

The holes 2502b for disturbing the flow can be of any structure. One of the wings 2502a and one of the holes 2502b can be eliminated as long as the flow is disturbed.

EXAMPLE 11

Figure 17:
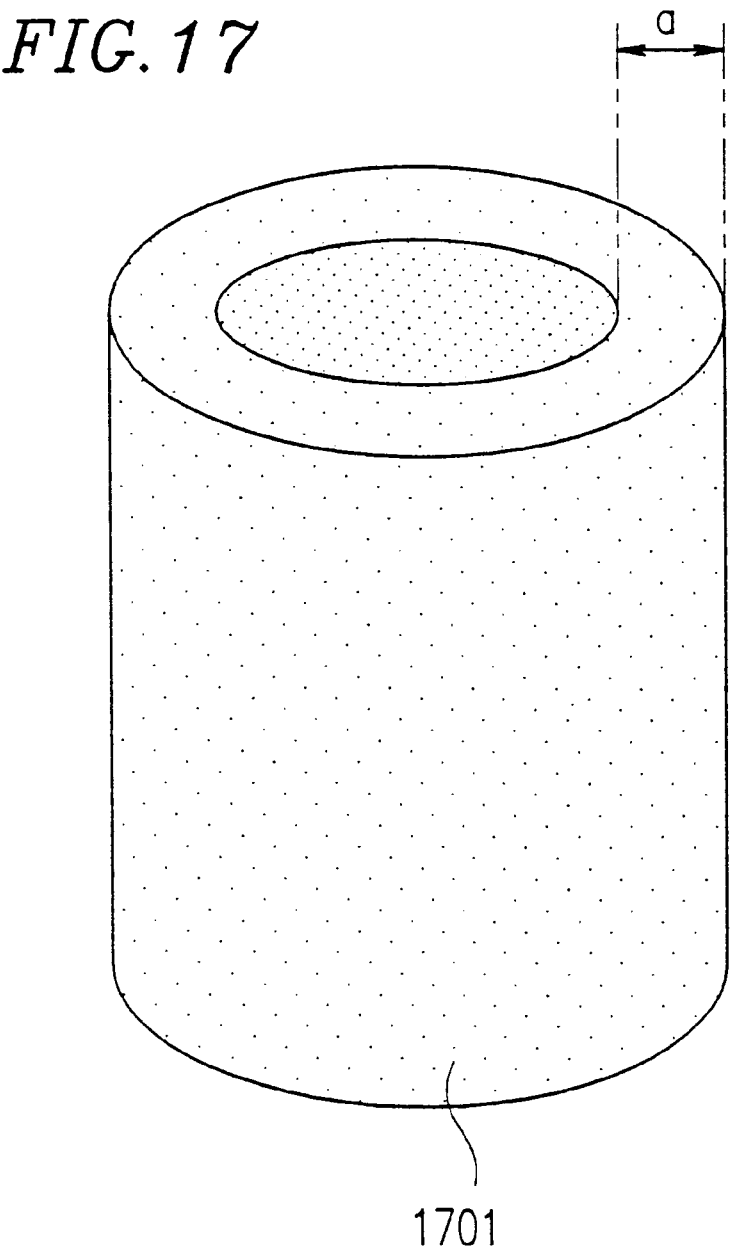
FIG. 17 is a perspective view of a heating element of a heating apparatus in an eleventh example according to the present invention.

FIG. 17 is a perspective view of a heating element 1701 of a heating apparatus in an eleventh example according to the present invention. The heating element 1701 includes a cylinder formed of a porous foaming metal material. The porous foaming metal material acts as a conductor, which forms a closed circuit.

The heating apparatus in the eleventh example has a structure shown in FIG. 1 with the heating element 101 in the container 105 being replaced by the heating element 1701 shown in FIG. 17.

The heating apparatus in the eleventh example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in the heating element 1701, and the eddy current and an electric resistance in the heating element 1701 generate Joule heat in the heating element 1701. By setting a thickness a of the heating element 1701 so that the total thickness of the conductor portions of the heating element 1701 is approximately the same as the skin depth, the eddy current flows uniformly in the heating element 1701 and thus the magnetic flux can be efficiently utilized.

Since the heating element 1701 is formed of a porous foaming material, the heat exchange area for exchanging heat with the fluid is enlarged. Due to the many pores in the heating element 1701, a disturbance is generated in the flow of the fluid, which also improves the heat exchange efficiency.

The heating element 1701 is formed by simply cutting the foaming metal material.

In the case where water is heated by the heating apparatus in this example, water is substantially prevented from becoming large drops on a surface of the heating element 1701. Thus, the contact area between the water and the heating element 1701 is maintained sufficiently large. Accordingly, the heating apparatus in this example can be used as a vapor generator providing a satisfactory vaporization efficiency.

EXAMPLE 12

Figure 18A:
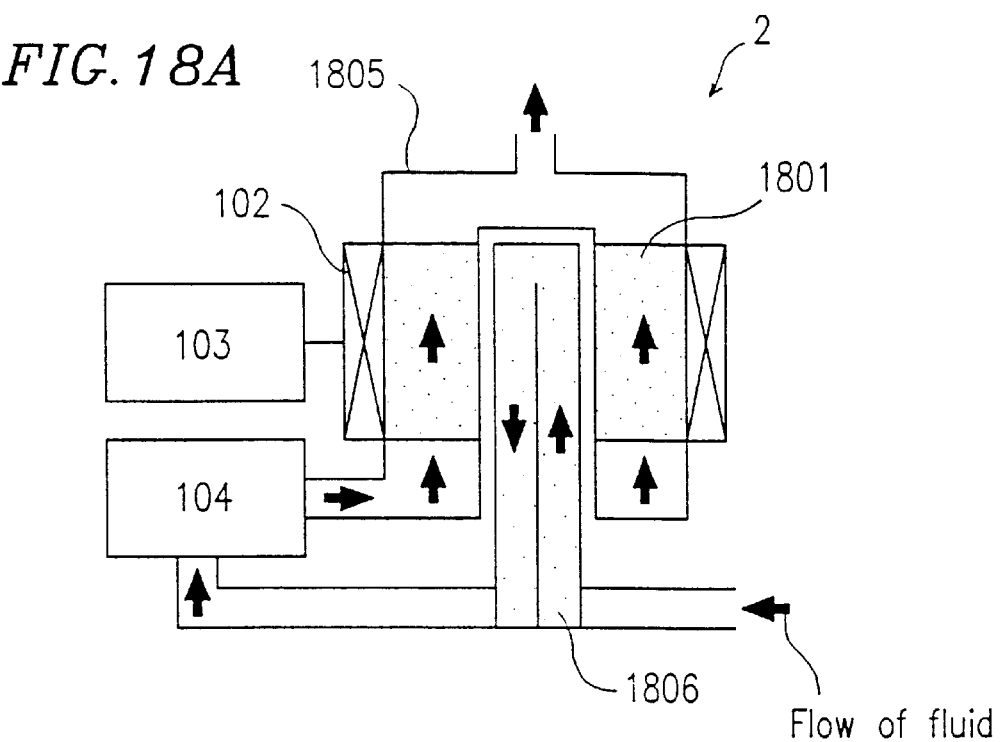
FIG. 18A is a schematic view of a heating apparatus in a twelfth example according to the present invention.

FIG. 18A is a schematic view of a heating apparatus 2 in a twelfth example according to the present invention. As shown in FIG. 18A, the heating apparatus 2 includes a cylindrical heating element 1801, a cylindrical container 1805 or accommodating the heating element 1801, and a water purifier 1806 located in a hollow portion at a center of the container 1805. The heating apparatus 2 further includes an induction heating coil 102, a high frequency power supply device 103, and a fluid transfer device 104 as shown in FIG. 1.

As the heating element 1801, any of the heating elements described in the previous examples can be applied as long as they have a cylindrical shape. As the container 1805, any type of container can be applied as long as it allows the water purifier 1806 therein. The water purifier 1806 is of a general type formed of a hollow fiber membrane or active carbon.

The heating apparatus 2 operates, for example, in the following manner.

Water is first purified by the water purifier 1806 and then flows to the fluid transfer device 104. Then, the water is sent to the container 1805, heated by the heating element 1801 and then discharged from the container 1805.

In this structure, the water always passes through the vicinity of the heating element 1801, not the center of the heating element 1801. Thus, the heat exchange efficiency is improved. The provision of the water purifier 1806 in the hollow portion in the container 1805 saves space. The heating apparatus 2 in this example can be used as a hot water supplier for supplying hot water suitable for drinking.

Figure 18B:
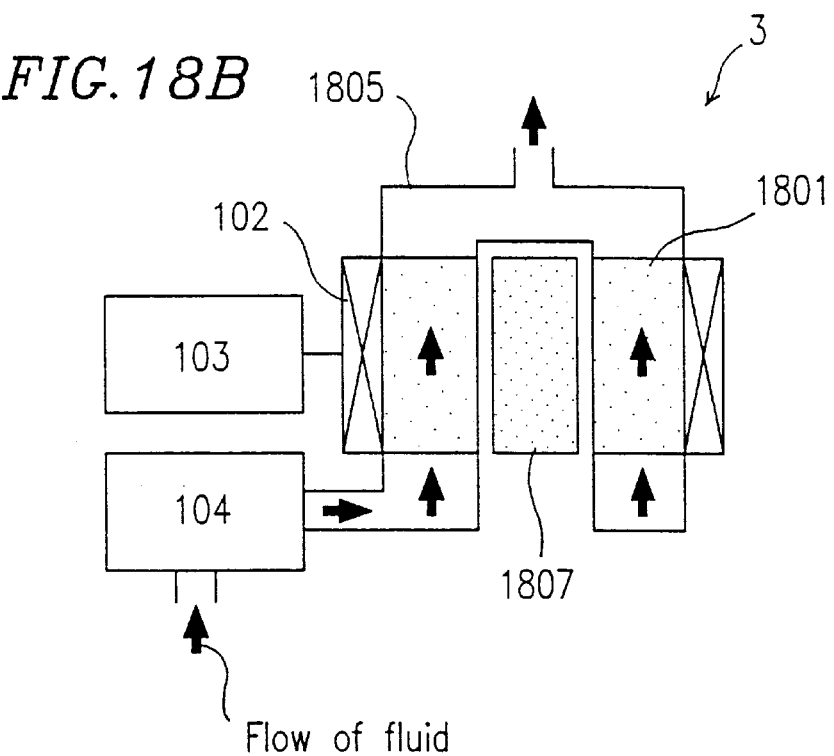
FIG. 18B is a schematic view of a heating apparatus in a modification of the twelfth example according to the present invention.

FIG. 18B is a schematic view of a heating apparatus 3 in a modification of the twelfth example. The heating apparatus 3 includes a ferromagnetic body 1807 formed of ferrite or the like in the hollow portion in the container 1805 in lieu of the water purifier 1806.

In such a structure, the ferromagnetic body 1807 located inside the induction heating coil 102 raises the magnetic flux density crossing the heating element 1801 and thus enhances the induction electromotive force. Accordingly, the current flowing in the induction heating coil 102 or the number of windings of the induction heating coil 102 can be decreased. The reduction in the current flowing in the induction heating coil 102 decreases a loss of the high frequency power supply device 103. The reduction in the number of windings of the induction heating coil 102 decreases a loss caused by the Joule heat of the induction heating coil 102 per se since the resistance of the induction heating coil 102 decreases.

As described above, in this example, a container having a structure for preventing a fluid to flow in a portion which is not used for heat exchange is used so as to improve the heat exchange efficiency. Furthermore, the free space is utilized to water purification or further improvement in the heat exchange efficiency.

EXAMPLE 13

Figure 19:
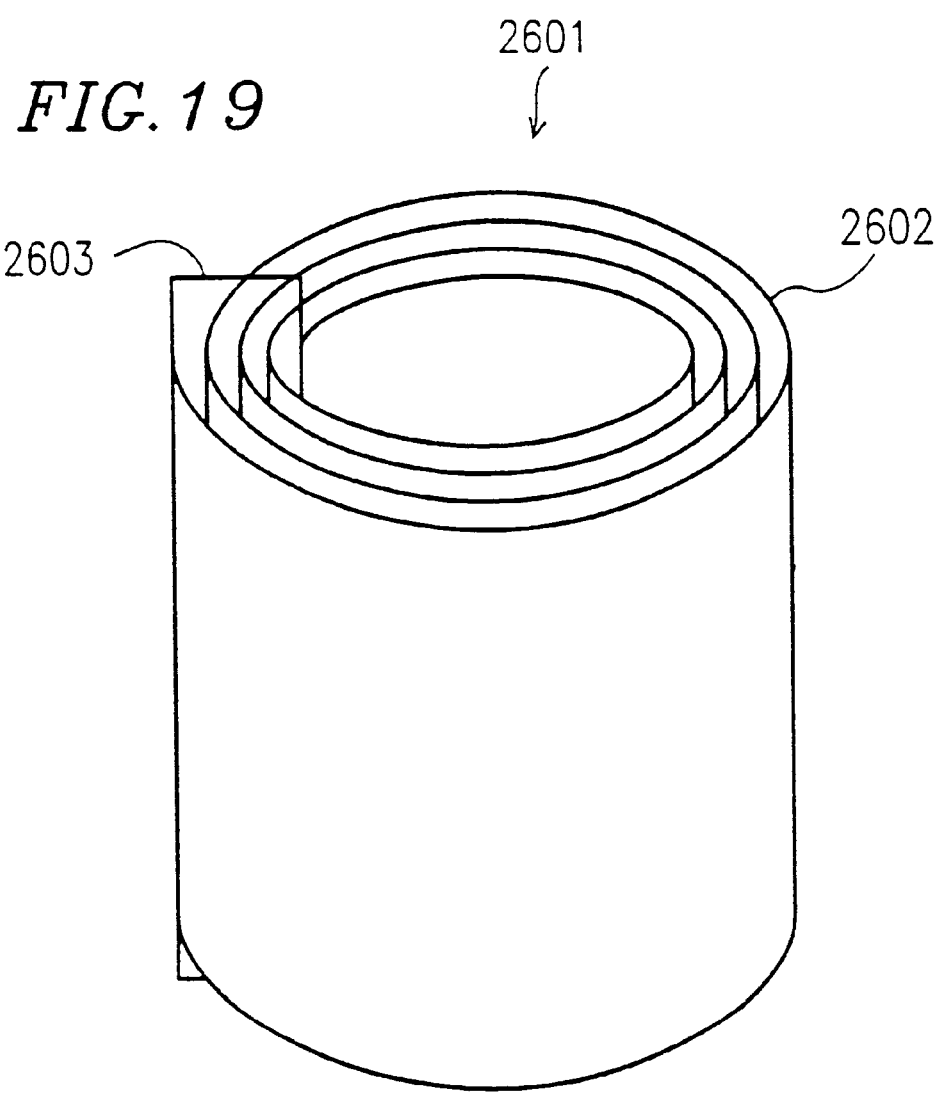
FIG. 19 is a perspective view of a heating element of a heating apparatus in a thirteenth example according to the present invention.

FIG. 19 is a perspective view of a heating element 2601 of a heating apparatus in a thirteenth example according to the present invention. The heating element 2601 includes a stainless steel plate 2602 which is circumferentially wound upon itself so as to have a cylindrical shape and a connector 2603 formed of a temperature fuse for connecting both of two ends of the stainless steel plate 2602. The stainless steel plate 2602 acts as a conductor, which forms a closed circuit together with the connector 2603.

The heating apparatus in the thirteenth example has a structure shown in FIG. 1 with the heating element 101 in the container 105 being replaced by the heating element 2601 shown in FIG. 19.

The heating apparatus in the thirteenth example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in the heating element 2601, and the eddy current and an electric resistance in the heating element 2601 generate Joule heat in the heating element 2601. In order to utilize the magnetic flux as efficiently as possible, the total thickness of the conductor is set appropriately.

The heating apparatus in the thirteenth example can be used in the following manner. First, water is supplied from the fluid transfer device 104 to the container 105 and is heated by the heating element 2601. In the case where the water is not supplied to the container 105, the temperature of the heating element 2601 becomes excessively high. When the temperature to which the container 105 is resistant is relatively low, the container 105 deteriorates. In order to avoid such deterioration, the melting point of connector 2603 formed of a temperature fuse is set so that the connector 2603 is disconnected by melting when the temperature of the container 105 reaches a prescribed level which lower than the melting point of the container 105. By such setting, the connector 2603 is disconnected before the temperature of the heating element 2601 becomes higher than the melting point of the container 105, and thus the closed circuit formed of the stainless steel 2601 and the connector 2603 is opened to stop the flow of an eddy current in the heating element 2601. Thus, the heating element 2601 stops heating. This is effective to maintain safely against an abnormal temperature rise caused by, for example, heating a container with no fluid therein.

In such a structure, the connector 2603 formed of a temperature fuse acts as a safety device for stopping the heating of the heating element 2601 when the temperature of the heating element 2601 is excessively high but does not resume heating.

Such a safety device can also be realized by a bimetal for opening a closed circuit when the temperature is excessively high.

EXAMPLE 14

Figure 20:
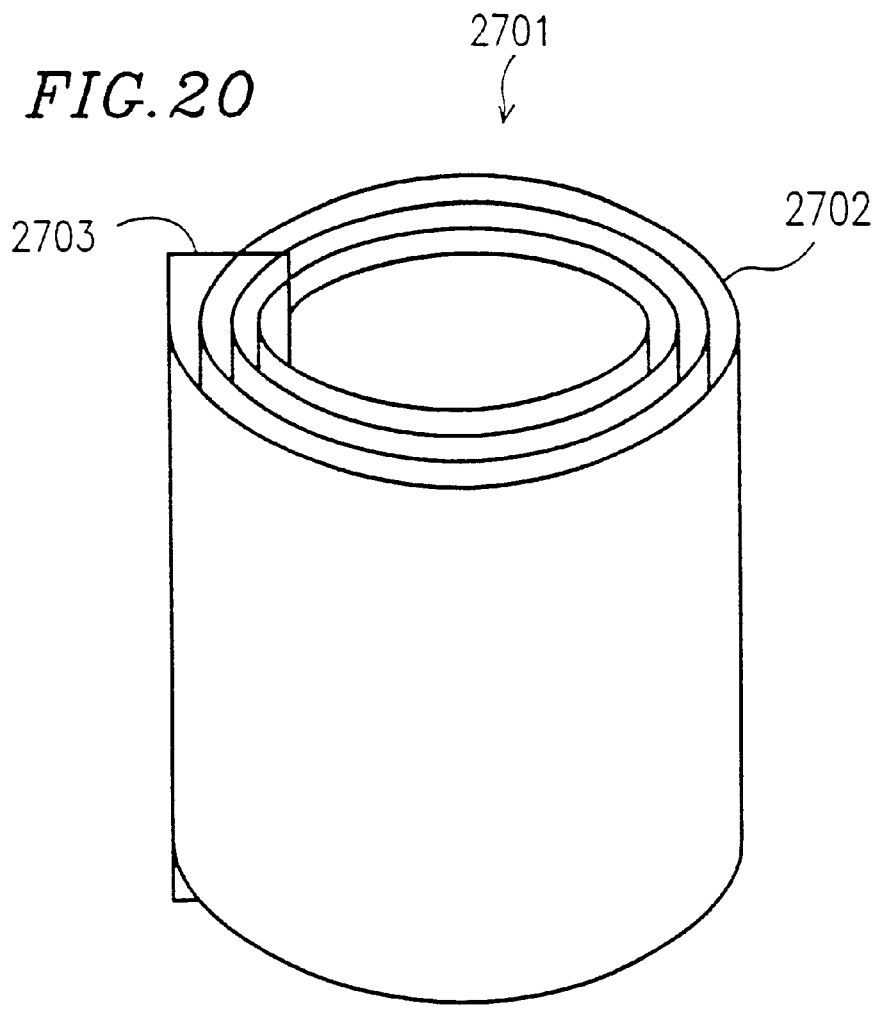
FIG. 20 is a perspective view of a heating element of a heating apparatus in a fourteenth example according to the present invention.

FIG. 20 is a perspective view of a heating element 2701 of a heating apparatus in a fourteenth example according to the present invention. The heating element 2701 includes a stainless steel plate 2702 which is circumferentially wound upon itself to have a cylindrical shape and a connector 2703 for connecting both of two ends of the stainless steel plate 2702. The stainless steel plate 2702 acts as a conductor, which forms a closed circuit together with the connector 2703. The conductor is formed of a positive characteristic resistance change metal plate (described below).

The heating apparatus in the fourteenth example has a structure shown in FIG. 1 with the heating element 101 in the container 105 being replaced by the heating element 2701 shown in FIG. 20.

The heating apparatus in the fourteenth example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in the heating element 2701, and the eddy current and an electric resistance in the heating element 2701 generate Joule heat in the heating element 2701. In order to utilize the magnetic flux as efficiently as possible, the total thickness of the conductor is set appropriately.

Figure 21:
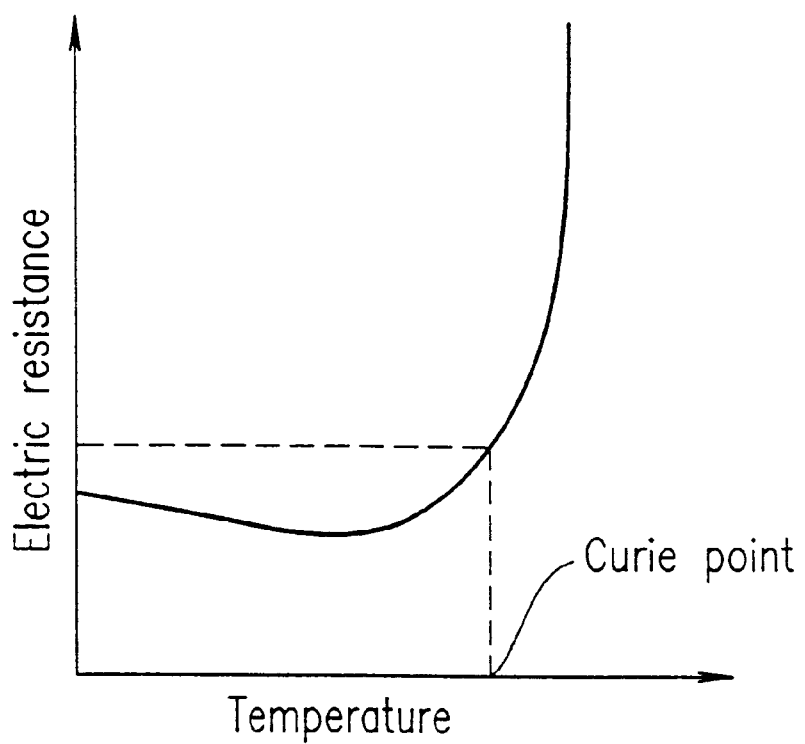
FIG. 21 is a graph illustrating the resistance characteristic of a conductor of the heating element shown in FIG. 20.

The positive characteristic resistance change metal plate used as the conductor has a resistance which changes in accordance with the temperature as shown in FIG. 21. The curie point at which the resistance drastically changes can be set at a desirable temperature (e.g., 95° C.).

In such a state, when the temperature of the heating element 2701 reaches 95° C., the resistance of the connector 2703 drastically rises so as to make difficult the flow of the eddy current in the closed circuit formed of the stainless steel plate 2702 and the connector 2703. When the amount of the eddy current reduces, the temperature of the heating element 2701 lowers. When the temperature of the heating element 2701 lowers, the resistance of the connector 2703 returns to the previous level, which facilitates the flow of the eddy current in the closed circuit. Thus, heating is resumed.

In this manner, the connector 2703 automatically adjusts the temperature of the heating element 2701.

EXAMPLE 15

Figure 22:
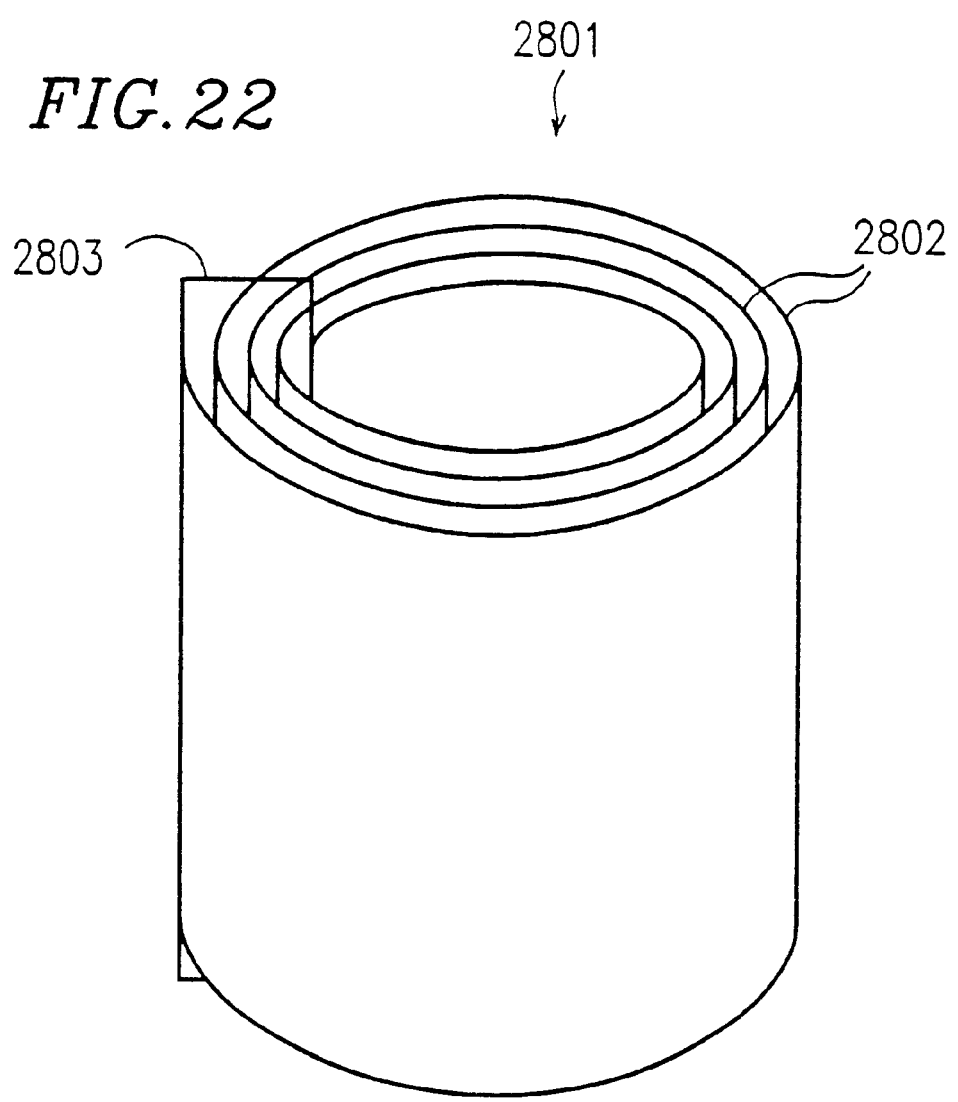
FIG. 22 is a perspective view of a heating element of a heating apparatus in a fifteenth example according to the present invention.

FIG. 22 is a perspective view of a heating element 2801 of a heating apparatus in a fifteenth example according to the present invention. The heating element 2801 includes a shape memory alloy 2802 which is circumferentially wound upon itself so as to have a cylindrical shape and a flexible connector 2803 for connecting both of two ends of the shape memory alloy plate 2802. The flexible connector 2803 is freely deformable. The shape memory alloy plate 2802 acts as a conductor, which forms a closed circuit together with the connector 2803.

The heating apparatus in the fifteenth example has a structure shown in FIG. 1 with the heating element 101 in the container 105 being replaced by the heating element 2801 shown in FIG. 22.

The heating apparatus in the fifteenth example operates, for example, in the following manner.

The fluid transfer device 104 supplies a fluid to the container 105. In parallel, the high frequency power supply device 103 supplies high frequency power to the induction heating coil 102, and thus causes a high frequency AC magnetic field to be generated from the induction heating coil 102. Then, an eddy current is generated in the heating element 2801, and the eddy current and an electric resistance in the heating element 2801 generate Joule heat in the heating element 2801. In order to utilize the magnetic flux as efficiently as possible, the total thickness of the conductor is set appropriately.

Figure 23A:
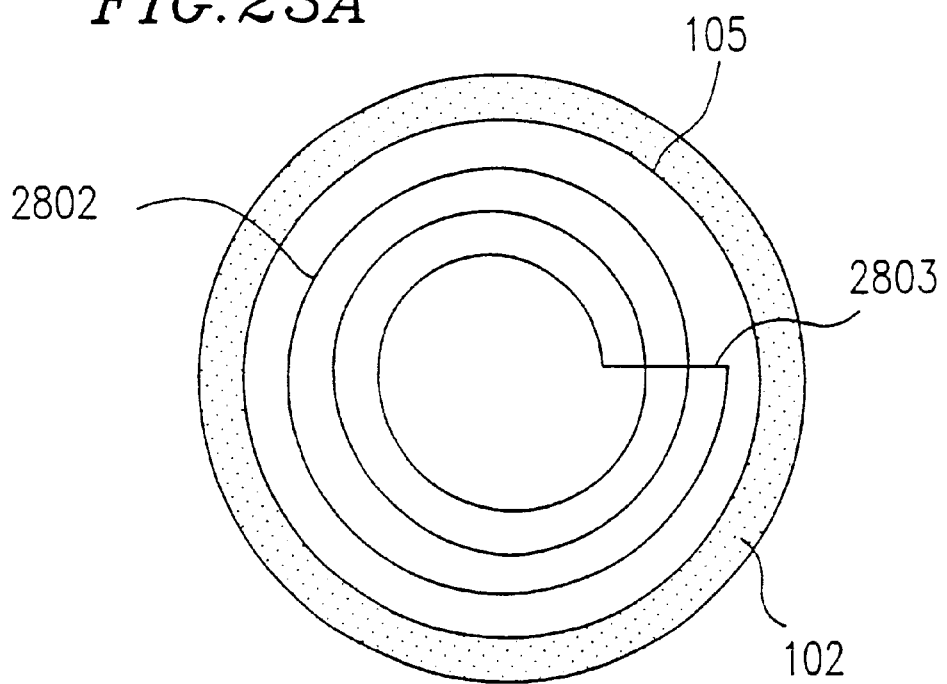
FIGS. 23A and 23B are top views of the heating element shown in FIG. 22 in two different states.

The shape memory alloy plate 2802 has a shape shown in FIG. 23A up to a prescribed temperature (e.g., 95° C.); i.e., the shape memory alloy plate 2802 is substantially fully extended only to be limited by the container 105. At the temperature above the prescribed level, the shape memory alloy plate 2802 contracts as shown in FIG. 23B.

In the state shown in FIG. 23A, the shape memory alloy plate 2802 is sufficiently heated by the high frequency AC magnetic field supplied by an induction heating coil 102. When the temperature of the shape memory alloy plate 2802 reaches, for example, 95° C., the shape memory alloy plate 2802 is deformed to the shape shown in FIG. 23B. In this state, the shape memory alloy plate 2802 becomes farther from the induction heating coil 102, which deteriorates the magnetic coupling of the plate 2802 and the coil 102. Therefore, the amount of the eddy current flowing in the shape memory alloy plate 2802 is reduced so as to substantially prevent the heating of the shape memory alloy plate 2802. When the temperature of the shape memory alloy plate 2802 is lowered to a level below 95° C. after a certain time period, the shape memory alloy plate 2802 returns to the shape shown in FIG. 23A and resumes heat generation. In this manner, the temperature is automatically adjusted.

In the case where tap water or the like is heated by the heating apparatus in the fifteenth example, calcium carbonate contained in the tap water is possibly deposited on and adheres to a surface of the conductor of the heating element 2801 since the solubility of calcium carbonate is lowered as the temperature rises. The calcium carbonate adhering in this manner is generally referred to as scale. When the surface of the heating element is covered with the scale, the heat exchange is prevented.

Figure 23B:
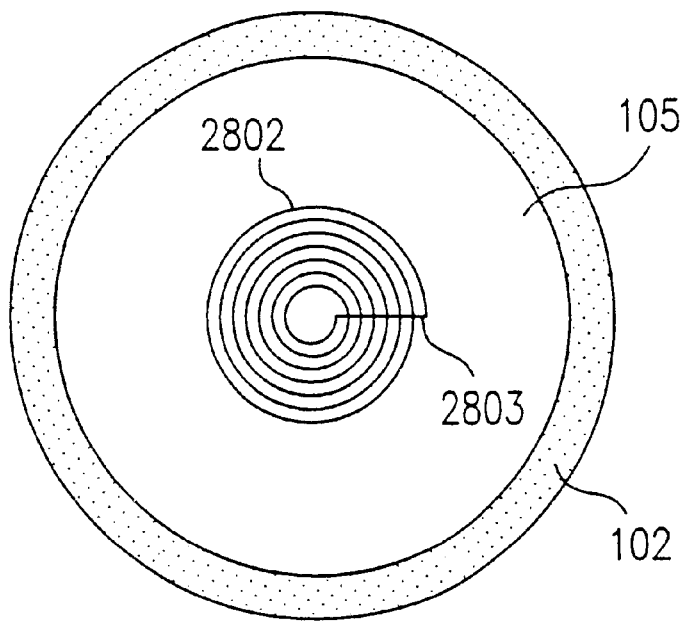

However, in this example, the shape memory alloy plate 2802 changes the shape repeatedly between the shape in FIG. 23A and the shape in FIG. 23B. A mechanical force generated by such a shape change prevents the adhesion of calcium carbonate and also peels off calcium carbonate adhering to the conductor.

As described above, use of a shape memory alloy for the heating element 2801 allows for automatic temperature adjustment, prevention of scale adhesion, and scale removal realized without using any special device.

EXAMPLE 16

Figure 24A:
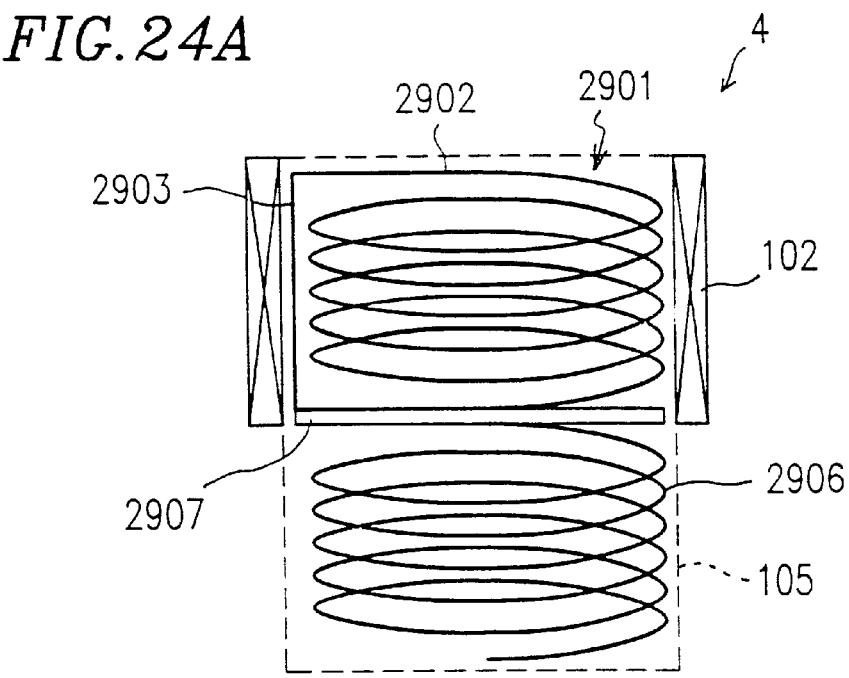
FIGS. 24A and 24B are partial schematic views of a heating apparatus in a sixteenth example according to the present invention in two different states.
Figure 24B:
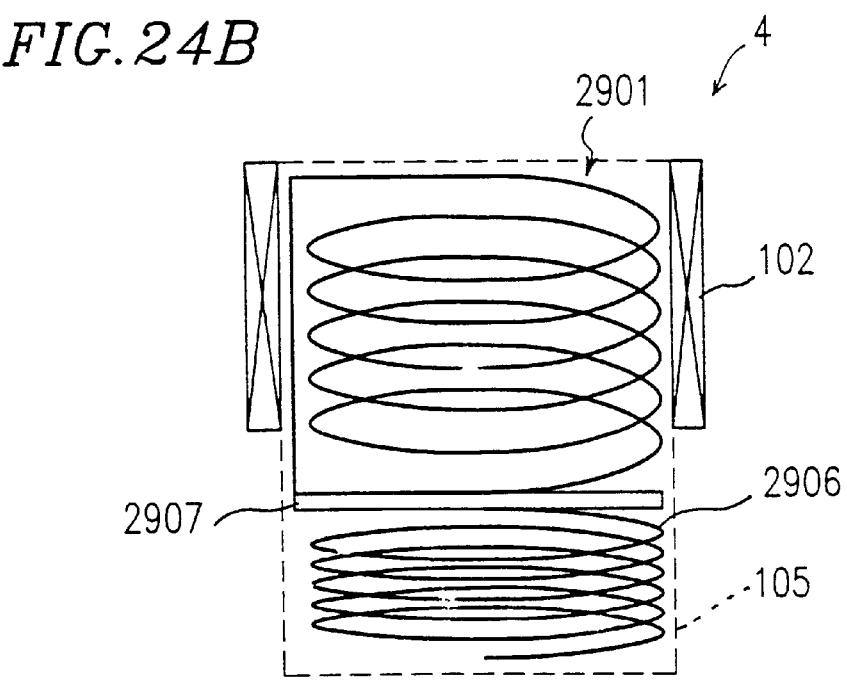

FIGS. 24A and 24B are partial schematic views of a heating apparatus 4 in a sixteenth example according to the present invention in two different states. The heating apparatus 4 in the sixteenth example includes a heating element 2901, a coil spring 2906, a container 105 for accommodating the heating element 2901 and the coil spring 2906, and a flat plate 2907 inserted between the heating element 2901 and the coil spring 2906. The heating apparatus 4 further includes an induction heating coil 102, a high frequency power supply device (not shown) for supplying high frequency power to the induction heating coil 102, and a fluid transfer device (not shown) for transferring a fluid to the heating element 2901. The coil spring 2906 constantly presses the heating element 2901 through the flat plate 2907.

The heating element 2901 includes a shape memory alloy 2902 spirally wound and a connector 2903 for connecting both of two ends of the shape memory alloy 2902. The shape memory alloy 2902 acts as a conductor, which forms a closed circuit together with the connector 2903.

The shape memory alloy 2902 is contracted as shown in FIG. 24A below a prescribed temperature (e.g., 95° C.) and is entirely located at a center inside the induction heating coil 102. The shape memory alloy 2902 memorizes the shape shown in FIG. 24B and is extended to such a shape when the temperature thereof reaches, for example, 95° C. At this point, the shape of the shape memory alloy 2902 is stabilized since the elastic forces of the shape memory alloy 2902 and the coil spring 2906 are balanced. In this state, a part of the shape memory alloy 2902 is not covered by the induction heating coil 102.

In the state of FIG. 24A, the shape memory alloy 2902 is sufficiently heated by the high frequency AC magnetic field supplied by the induction heating coil 102. When the temperature of the shape memory alloy 2902 reaches, for example, 95° C., the shape memory alloy 2902 is deformed to the shape shown in FIG. 24B. In this state, a part of the shape memory alloy 2902 is not covered by the induction heating coil 102, and the induction electromotive force is not generated in the uncovered part. Therefore, the amount of the eddy current flowing in the shape memory alloy 2902 is reduced so as to reduce the amount of heat generated by the shape memory alloy 2902. Accordingly, the temperature of the shape memory alloy 2902 is lowered. When the temperature is lowered to a level below 95° C., the shape memory alloy 2902 returns to the shape shown in FIG. 24A and increases the amount of heat generation. In this manner, the temperature is automatically adjusted.

In the case where tap water or the like is heated by the heating apparatus in the sixteenth example, heat exchange is prevented by the scale for the reason described above. However, in this example, the adhesion of calcium carbonate as the scale is prevented and also the scale adhering to the conductor is peeled off by the repetitive shape change of the shape memory alloy 2902.

As described above, use of a shape memory alloy for the heating element 2901 allows for automatic temperature adjustment, prevention of scale adhesion, and scale removal realized without using any special device.

EXAMPLE 17

Figure 25:
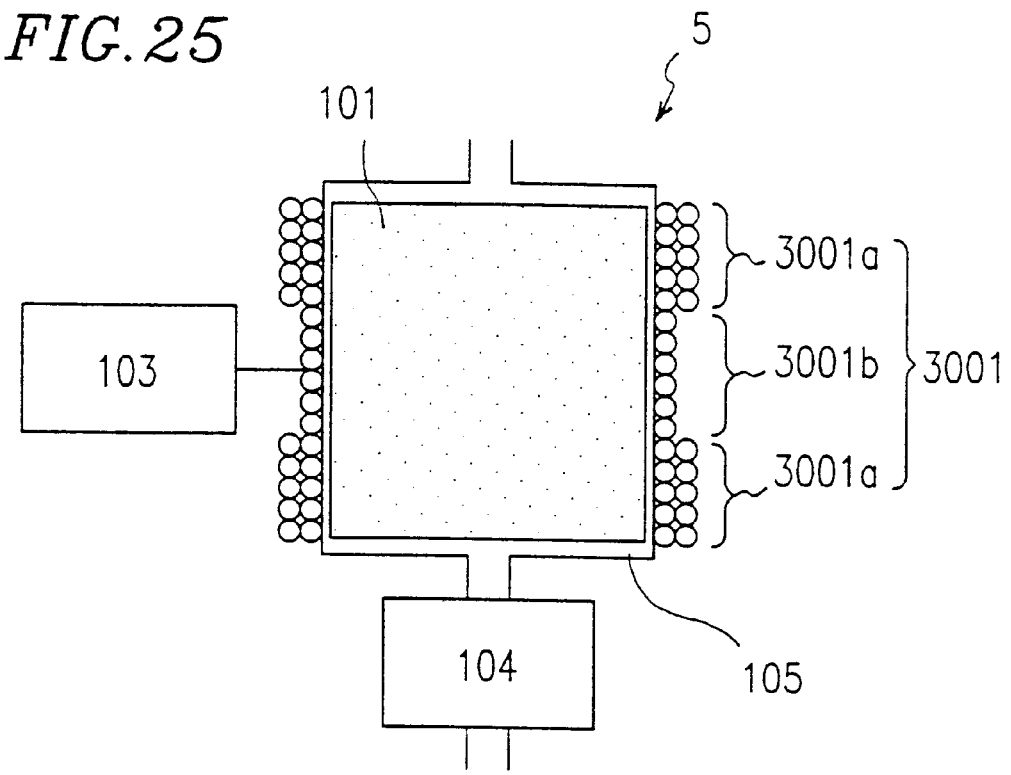
FIG. 25 is a schematic view of a heating apparatus in a seventeenth example according to the present invention.

FIG. 25 is a schematic view of a heating apparatus 5 in a seventeenth example according to the present invention. As shown in FIG. 25, the heating apparatus 5 includes an induction heating coil 3001 having two outer areas 3001a and one inner area 3001b.

The number of windings of each outer area 3001a per unit length is greater than that of the inner area 3001b per unit length.

In the case where a cylindrical solenoid having a limited length and wound uniformly between two ends thereof is used for the induction heating coil 3001, the magnetic flux density generated along the axis of the cylindrical solenoid is low in the vicinity of an opening of the solenoid and high in the vicinity of a center of the solenoid. Therefore, the magnetic flux density is low at both of two ends of a heating element 101 and high at a center thereof. In this case, the heat distribution is nonuniform.

In order to avoid such an inconvenience, the number of windings of each outer area 3001a is greater than that of the inner area 3001b. Accordingly, the magnetic flux density is uniform in the entirety of the induction heating coil 3001. Therefore, the magnetic flux density is also uniform in the entirety of the heating element 101, and the uniform heat generation in the heating element 101 is obtained.

EXAMPLE 18

Figure 26:
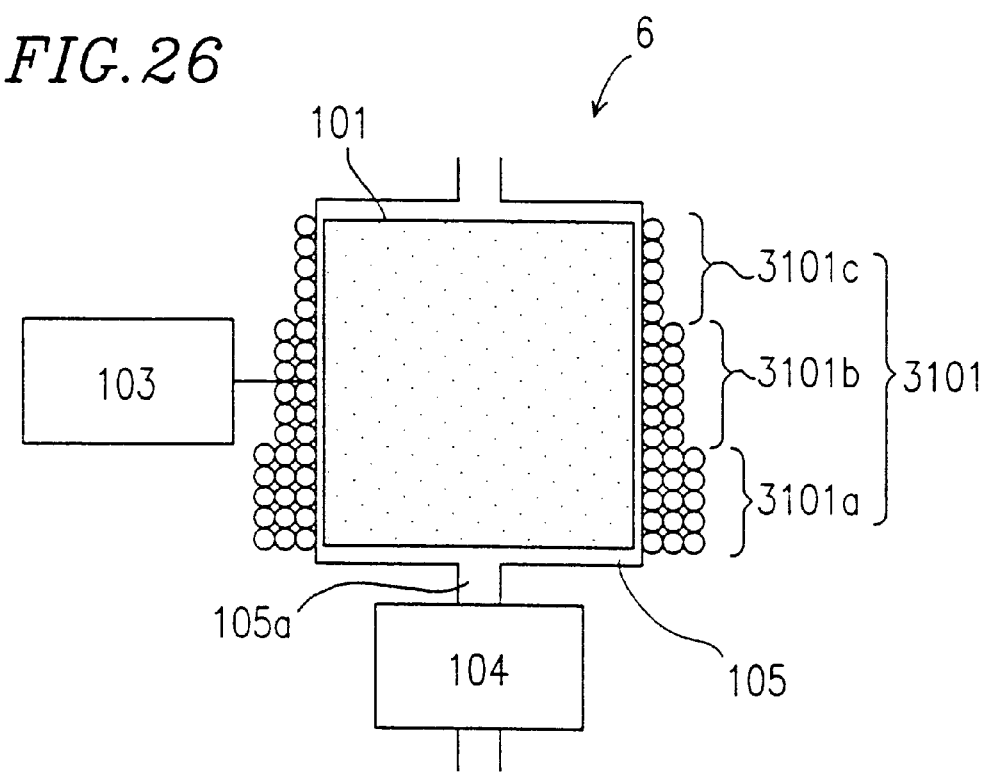
FIG. 26 is a schematic view of a heating apparatus in an eighteenth example according to the present invention.

FIG. 26 is a schematic view of a heating apparatus 6 in an eighteenth example according to the present invention. As shown in FIG. 26, the heating apparatus 6 includes an induction heating coil 3101 having a first area 3101a which is closest to a fluid intake 105a of the container 105, a second area 3101b slightly away from the fluid intake 105a, and a third area 3101c farthest from the fluid intake 105a.

The first area 3101a closest to the fluid intake 105a has the greatest number of windings per unit length and the third area 3101c farthest from the fluid intake 105a has the smallest number of windings per unit length.

The intensity of the high frequency AC magnetic field is defined by the number of windings of the induction heating coil and the amount of current. Since the number of windings of the coil closer to the fluid intake 105a is greater per unit length in this example, the magnetic flux density is also higher in an area closer to the fluid intake 105a. Accordingly, the heating element 101 generates more heat in an area closer to the fluid intake 105a.

In the case where tap water or the like is heated by the heating apparatus in the eighteenth example, the scale is more easily generated as the temperature is higher since, as described above, the solubility of calcium carbonate lowers as the temperature rises. As the temperature difference between the water and the heating element 101 increases, the difference in solubility of calcium carbonate at two different temperatures increases, and thus more scale is generated on a surface of the heating element 101.

In the case where heat exchange is performed between the fluid and the heating element 101, the temperature difference between the fluid and the heating element 101 is smaller as the power density on the heat exchange surface decreases.

Accordingly, the scale generation is restricted where the water temperature is relatively high by reducing the power density of the heating element 101 and thus reducing the amount of heat generation.

In the heating apparatus 6 in this example, the water temperature is sufficiently low to substantially prevent the generation of the scale in the vicinity of the fluid intake 105a of the container 105. This permits an increase in the temperature difference between the water and the heating element 101. Accordingly, in the vicinity of the intake 105a of the container 105, the number of windings of the induction heating coil 3101 per unit length is increased so as to increase the heat generation to sufficiently heat the water.

In an area far from the intake 105a of the container 105, the water temperature is relatively high. Therefore, the water heating needs to be restricted to a low level to maintain the temperature difference between the water and the heating element 101 small, so that the generation of scale is prevented. For this purpose, in an area far from the intake 105a, the number of windings of the induction heating coil 3101 per unit length is less than the rest of the induction heating coil 3101.

It should be noted that the structures of the elements of the heating apparatuses in the above-described examples can be combined in any possible manner.

As described above, according to the present invention, high frequency power is supplied from the high frequency power device to the induction heating coil, and the heating element is heated by the principle of induction heating. In the case where the heating element includes a conductor which is circumferentially or spirally wound, the heat exchange area per unit volume involved in heat exchange is enlarged and heating is performed uniformly. When the heating apparatus is used heat a liquid, the temperature of the liquid is raised to a level close to a boiling point with a small-volume heating element and also the heat exchange efficiency is improved.

In one embodiment of the invention, the heating element includes a plurality of non-magnetic metal bodies arranged concentrically. With such a shape, the heating apparatus can be produced relatively easily and thus at low cost. Since the heat exchange area per unit volume is enlarged, the liquid can be heated to a temperature close to a boiling point. Thus, the heat exchange efficiency is enhanced.

In one embodiment of the invention, the heating element includes at least one non-magnetic metal body and at least one magnetic metal body provided inside the at least one non-magnetic metal body. The metal bodies are concentrically provided. In such a case, the temperature of the liquid flowing in a central part of the heating element is higher than the temperature of the fluid flowing in the rest of the heating element, so that the temperature distribution in the entirety of the heating element is uniform.

In one embodiment of the invention, a plurality of heating elements which have a small height are arranged in a stacked manner. Such an arrangement is easier to mass-produce than producing different sizes of heating elements in accordance with the use. In such a structure, the total length of the heating elements can be changed relatively easily and at relatively low cost by appropriately setting the input power to the heating elements and the power density of the heating elements.

In one embodiment of the invention, the conductor of the heating element is processed to be wave-like. By such processing, the contact area between the heating element and the liquid is enlarged, resulting in an enhanced heat exchange efficiency.

In one embodiment of the invention, an adsorbent such as, for example, active carbon is provided in a gap between overlapping parts of the conductor. By heating the heating element by the induction heating coil, trihalomethane adsorbed by the adsorbent is released together with a vapor. Thus, the trihalomethane adsorbing force of the adsorbent is recovered.

In one embodiment of the invention, a water-adsorbing material such as, for example, zeolite is provided in a gap between overlapping parts of the conductor. By heating the heating element by the induction heating coil, water is adsorbed by the adsorbent and vaporized. Thus, the water adsorbing force of the sponge is recovered.

In one embodiment of the invention, a material having a moisture maintenance capability is provided in a gap between overlapping parts of the conductor. By heating the heating element containing moisture by the induction heating coil, vapor is generated in whichever direction the heating element is directed.

In one embodiment of the invention, a catalyst is carried on the metal conductor included in the heating element uniformly generating heat. In such a structure, the catalyst is uniformly heated.

In one embodiment of the invention, the metal conductor of the heating element has a hole. In such a structure, the flow of the fluid is disturbed and thus the heat exchange efficiency is improved.

In one embodiment of the invention, the metal conductor of the heating element has a hole and also a wing in the vicinity of the hole for transferring a fluid from one surface of the conductor to another surface of the conductor. In such a structure, the heat exchange efficiency is further improved.

In one embodiment of the invention, the conductor of the heating element is formed of a porous material. Accordingly, the heating element is produced relatively easily.

In one embodiment of the invention, a container which prevents a fluid from passing through a part of the container not involved in heat exchange is used. In such a structure, the heat exchange efficiency is improved and the part not involved in heat exchange can be used for water purification or improvement of the heating characteristics.

In one embodiment of the invention, the heating element has a closed circuit which is disconnected when the heating element reaches a prescribed temperature.

When the temperature of the heating element becomes excessively high, a component of the heating element acts as a safety device which does not allow the heating element to be heated again.

In one embodiment of the invention, the conductor is formed of a material having a resistance changing in accordance with a temperature. Accordingly, automatic temperature adjustment is performed by the conductor.

In one embodiment of the invention, the conductor is formed of a shape memory alloy. Accordingly, automatic temperature adjustment is performed. Moreover, adhesion of scale to the surface of the shape memory alloy is prevented, and the scale adhering to the surface can be removed without any specific device.

In one embodiment of the invention, the conductor of the heating element is formed of a shape memory alloy, and the heating element includes a spring for restricting a shape change of the conductor. By such a structure, the automatic temperature adjustment is performed. Moreover, adhesion of scale to the surface of the shape memory alloy is prevented, and the scale adhering to the surface can be removed without any specific device.

In one embodiment of the invention, a coil provided on an outer surface of the container has a greater number of windings per unit length in an area in the vicinity of an end of the coil than an area at a center of the coil. Accordingly, the magnetic flux density is uniformized so as to heat the heating element uniformly.

In one embodiment of the invention, a coil has a greater number of windings per unit length in an area in the vicinity of one end of the coil than in an area in the vicinity of another end of the coil. Accordingly, the power density of an area of the heating element in contact with a high temperature water is reduced so as to prevent deposition of scale.

Various other modifications will be apparent to and can be readily made by those skilled in the art with out departing from the scope and spirit of this invention. Accordingly, it is not intended that the scope of the claims appended hereto be limited to the description as set forth herein, but rather that the claims be broadly construed.

What is claimed is:

1. A heating apparatus, comprising:
a heating element having a conductor, at least part of which is an electrically closed circuit along which an eddy current flows;
a container for accommodating the heating element;
a magnetic field induction section for induction-heating the heating element; and
a high frequency power supply device for supplying high frequency power to the magnetic field induction section,
whwerein the heating element is induction-heated by an AC magnetic field generated by the magnetic field induction section;
wherein the heating element is circumferentially wound around itself to form a cylindrical shape having two different points thereof electrically connected to each other by a connector so as to form the electrically closed circuit; and
wherein overlapping parts of the conductor of the circumferentially wound heating element have a total thickness smaller than a skin depth of the conductor which is suitable for generating an electromotive force to cause the eddy current to flow in each of the overlapping parts along the closed circuit.

2. A heating apparatus according to claim 1, wherein the heating element includes a plurality of non-magnetic metal bodies arranged concentrically.

3. A heating apparatus according to claim 1, wherein the heating element includes at least one non-magnetic metal body and at least one magnetic metal body provided inside the at least one non-magnetic metal body, the metal bodies being concentrically provided.

4. A heating apparatus according to claim 1, comprising a plurality of heating elements arranged in the container.

5. A heating apparatus according to claim 1, wherein the conductor of the heating element is processed to be wave-like.

6. A heating apparatus according to claim 1, further comprising an adsorbent provided in a gap between overlapping parts of the conductor.

7. A heating apparatus according to claim 1, further comprising a water-adsorbing material provided in a gap between overlapping parts of the conductor.

8. A heating apparatus according to claim 1, further comprising a material having a moisture maintenance capability provided in a gap between overlapping parts of the conductor.

9. A heating apparatus according to claim 1, further comprising a catalyst on the conductor.

10. A heating apparatus according to claim 1, wherein the conductor has a hole.

11. A heating apparatus according to claim 10, wherein the conductor has a wing in the vicinity of the hole for transferring a fluid from one surface of the conductor to another surface of the conductor.

12. A heating apparatus according to claim 1, wherein the conductor is porous.

13. A heating apparatus according to claim 1, wherein the container allows a fluid to pass through a part of the container involved in heat exchange.

14. A heating apparatus according to claim 1, wherein the heating element has a closed circuit which is disconnected when the heating element reaches a prescribed temperature.

15. A heating apparatus according to claim 1, wherein the conductor is formed of a material having a thermal dependent resistance.

16. A heating apparatus according to claim 1, wherein the conductor is formed of a material memorizing a prescribed shape and recoverable to the prescribed shape in accordance with a temperature.

17. A heating apparatus according to claim 1, further comprising a spring for restricting a shape change of the conductor.

18. A heating apparatus according to claim 1, wherein the magnetic field induction section includes a coil provided on an outer surface of the container, the coil having a greater number of windings per unit length in an area in the vicinity of an end of the coil than an area at a center of the coil.

19. A heating apparatus according to claim 1, wherein the magnetic field induction section includes a coil having two ends provided on an outer surface of the container, the coil having a greater number of windings per unit length in an area in the vicinity of one end of the coil than in an area in the vicinity of another end of the coil.

20. A heating apparatus, comprising:
a heating element having a conductor at least a part of which is an electrically closed circuit along which an eddy current flows, the conductor being wound circumferentially around itself to form a cylindrical shape having two different points thereof electrically connected to each other by a connector so as to form the electrically closed circuit and overlapping parts of the conductor of the circumferentially wound heating element having a total thickness smaller than a skin depth of the conductor which is suitable for generating an electromotive force to cause the eddy current to flow in each of the overlapping parts along the closed circuit;
a container within which the heating element is accommodated;
a magnetic field induction section for induction-heating the heat element by an AC magnetic field generated by the magnetic field induction section; and
a high frequency power supply device for supplying high frequency power to the magnetic field induction section.

* * * * *

UNITED STATES PATENT AND TRADEMARK OFFICE
CERTIFICATE OF CORRECTION

PATENT NO. : 6,297,483 B2  Page 1 of 1
DATED : October 2, 2001
INVENTOR(S) : Sadahira et al.

It is certified that error appears in the above-identified patent and that said Letters Patent is hereby corrected as shown below:

<u>Title page,</u>
Item [30], Foreign Application Priority Data, please add
-- August 28, 1996  (JP)  8-226330 --.
FOREIGN PATENT DOCUMENTS, please add the following:
-- 2 219 715     12/1989     (GB)
   2 713 871     06/1995     (FR)
   3-98286       04/1991     (JP) --

Item [56], References Cited, U.S. PATENT DOCUMENTS, please add
-- 1,035,225  07/1966  Morey. --

<u>Column 23,</u>
Line 19, please delete "whwerein" and insert -- wherein --.

Signed and Sealed this

Third Day of December, 2002

JAMES E. ROGAN
*Director of the United States Patent and Trademark Office*